(12) United States Patent
Zhang

(10) Patent No.: US 8,723,481 B2
(45) Date of Patent: May 13, 2014

(54) BATTERY PACK WITH BALANCING MANAGEMENT

(75) Inventor: Wei Zhang, Shanghai (CN)

(73) Assignee: O2Micro, Inc., Santa Clara, CA (US)

( * ) Notice: Subject to any disclaimer, the term of this patent is extended or adjusted under 35 U.S.C. 154(b) by 331 days.

(21) Appl. No.: 13/222,358

(22) Filed: Aug. 31, 2011

(65) Prior Publication Data

US 2011/0316483 A1    Dec. 29, 2011

Related U.S. Application Data

(63) Continuation-in-part of application No. 12/850,033, filed on Aug. 4, 2010, now Pat. No. 8,198,862.

(30) Foreign Application Priority Data

Jun. 25, 2010    (CN) .......................... 2010 1 0215983
Aug. 5, 2011    (CN) .......................... 2011 1 0228717

(51) Int. Cl.
   *H02J 7/00*    (2006.01)
(52) U.S. Cl.
   USPC ............ 320/118; 320/116; 320/119; 320/127
(58) Field of Classification Search
   USPC .................................. 320/118, 119, 116, 127
   See application file for complete search history.

(56) References Cited

U.S. PATENT DOCUMENTS

| | | | |
|---|---|---|---|
| 5,504,415 A | 4/1996 | Podrazhansky et al. | |
| 5,519,563 A * | 5/1996 | Higashijima et al. | 361/16 |
| 6,008,623 A * | 12/1999 | Chen et al. | 320/118 |
| 6,020,718 A * | 2/2000 | Ozawa et al. | 320/116 |
| 6,160,376 A | 12/2000 | Kumar et al. | |
| 6,362,626 B2 | 3/2002 | Furukawa | |
| 6,452,362 B1 * | 9/2002 | Choo | 320/116 |
| 6,642,693 B2 | 11/2003 | Anzawa et al. | |
| 6,919,707 B2 | 7/2005 | Kawai et al. | |
| 7,091,695 B2 | 8/2006 | Miyazaki et al. | |
| 7,211,984 B2 | 5/2007 | Patel et al. | |
| 7,378,819 B2 | 5/2008 | Wang | |
| 7,471,064 B2 | 12/2008 | Sobue et al. | |
| 7,564,217 B2 | 7/2009 | Tanigawa et al. | |
| 7,880,434 B2 | 2/2011 | White et al. | |
| 7,939,965 B2 | 5/2011 | Oh et al. | |
| 7,973,515 B2 | 7/2011 | Densham et al. | |
| 8,022,669 B2 | 9/2011 | Li | |
| 8,054,034 B2 | 11/2011 | Lim et al. | |

(Continued)

FOREIGN PATENT DOCUMENTS

| | | |
|---|---|---|
| CN | 101414759 A | 4/2009 |
| CN | 101467324 A | 6/2009 |

(Continued)

*Primary Examiner* — M'Baye Diao

(57) ABSTRACT

A battery management system includes multiple battery modules, first balancing units, second balancing units, and controllers. Each battery module is coupled to a respective first balancing unit, second balancing unit, and controller. A first controller of the controllers controls a first balancing unit of a first battery module to adjust a voltage output of the first battery module when the first controller determines the voltage output of the first battery module is greater than a combined voltage output of the first battery module and a second battery module, and controls a second balancing unit of the first battery module to adjust the combined voltage when the first controller determines the combined voltage is greater than the voltage output of the first battery module.

20 Claims, 15 Drawing Sheets

(56) References Cited

U.S. PATENT DOCUMENTS

| | | |
|---|---|---|
| 2002/0017895 A1 | 2/2002 | Kawashima |
| 2004/0027092 A1 | 2/2004 | Patel et al. |
| 2004/0036446 A1 | 2/2004 | Iwashima |
| 2005/0194932 A1* | 9/2005 | Kokubu ................ 320/116 |
| 2006/0022639 A1 | 2/2006 | Moore |
| 2006/0082343 A1 | 4/2006 | Sobue et al. |
| 2006/0087287 A1 | 4/2006 | Thrap |
| 2006/0139004 A1 | 6/2006 | Uesugi et al. |
| 2006/0255769 A1 | 11/2006 | Liu et al. |
| 2009/0039830 A1 | 2/2009 | Pellenc |
| 2009/0096420 A1 | 4/2009 | Lupu et al. |
| 2009/0167243 A1 | 7/2009 | Xiao et al. |
| 2009/0267566 A1 | 10/2009 | Yano |
| 2010/0190041 A1 | 7/2010 | Hou et al. |
| 2010/0225275 A1 | 9/2010 | Bucur et al. |

FOREIGN PATENT DOCUMENTS

| | | |
|---|---|---|
| CN | 100533912 C | 8/2009 |
| CN | 100574082 C | 12/2009 |
| CN | 100588024 C | 2/2010 |
| TW | 201008077 A | 2/2010 |
| TW | 201027880 A | 7/2010 |

* cited by examiner

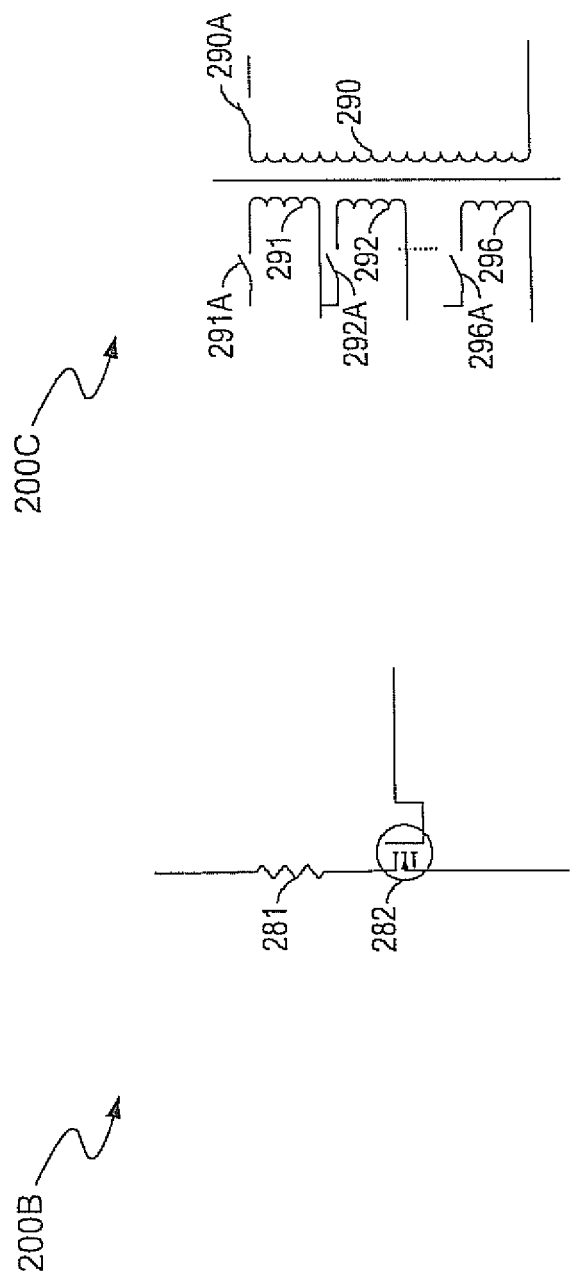

Multi Battery Pack Balancing circuit

Multi Battery Pack Balancing circuit

BATTERY PACK WITH BALANCING MANAGEMENT

CROSS REFERENCE TO RELATED APPLICATION

This Application claims priority to Chinese Patent Application Number 201110228717.8; filed on Aug. 5, 2011, which is a continuation in part of and claims priority to U.S. patent application Ser. No. 12/850,033, entitled "BATTERY PACK WITH BALANCING MANAGEMENT" filed Aug. 4, 2010, which claims priority to Chinese Patent Application Number 201010215983.2, filed on Jun. 25, 2010, which is hereby incorporated by reference.

TECHNICAL FIELD

The present disclosure relates generally to the field of rechargeable batteries and more specifically to the field of rechargeable battery module balancing.

BACKGROUND

During the past few decades, there has been an increasing interest in electronic devices, such as power supplies for various applications. The increasing demand for power supplies has resulted in the continuous development of battery packs, e.g., rechargeable battery packs.

A battery pack can consist of multiple battery cells coupled in series. When one of the battery cells is damaged, the lifetime of the battery pack will be shortened. An unbalance between any two of the battery cells can lead to a reduction in battery lifetime. FIG. 1 illustrates a block diagram of a conventional lead-acid battery pack 100. The lead-acid battery pack 100 is generally employed in low cost applications due to its simple structure.

The lead-acid battery pack 100 can include multiple battery modules 101-104 coupled in series. Each of the battery modules 101-104 can consist of six battery cells 111-116 and two electrodes 120 and 129. Only a voltage of each battery module can be monitored via the two electrodes 120 and 129. Once any of the battery cells 101-106 is damaged, the entire battery pack 100 will be damaged. An unbalance between any two of the battery cells 101-106 can further shorten the lifetime of the lead-acid battery pack 100.

SUMMARY OF THE INVENTION

Embodiments of a battery management system according to this disclosure provide solutions to the challenges inherent in balancing a plurality of battery modules. Each of the battery modules includes a plurality of battery cells. In one embodiment, a battery management system for a battery pack includes a plurality of battery modules and a plurality of first balancing units coupled to the plurality of battery modules. The battery management system also includes a plurality of second balancing units coupled to the plurality of battery modules, wherein a first balancing unit of the plurality of first balancing units and a second balancing unit of the plurality of second balancing units are coupled to each respective battery module. Lastly, the battery management system includes a plurality of controllers coupled to the plurality of battery modules, wherein each controller is coupled to a respective battery module. A first controller of the plurality of controllers is operable to control a first balancing unit of a first battery module to adjust a voltage output of the first battery module when the first controller determines a portion of the voltage output of the first battery module is greater than a portion of a combined voltage output of the first battery module and a second battery module. The first controller of the plurality of controllers is further operable to control a second balancing unit of the first battery module to adjust the combined voltage output of the first battery module and the second battery module when the first controller determines the portion of the combined voltage output of the first battery module and the second battery module is greater than the portion of the voltage output of the first battery module.

In another embodiment, a method for balancing a plurality of battery modules in a battery pack is presented. The method includes comparing a portion of a voltage output of a first battery module to a portion of a combined voltage output of the first battery module and a second battery module, and adjusting the voltage output of the first battery module when the portion of the voltage output of the first battery module is greater than the portion of the combined voltage output of the first battery module and the second battery module, and adjusting the combined voltage output of the first battery module and the second battery module when the portion of the combined voltage output of the first battery module and the second battery module is greater than the portion of the voltage output of the first battery module.

BRIEF DESCRIPTION OF THE DRAWINGS

The present invention will be better understood from a reading of the following detailed description, taken in conjunction with the accompanying drawing figures in which like reference characters designate like elements and in which:

FIG. 2B illustrates a structure of a balancing circuit in a battery management system for a battery pack, in accordance with one embodiment of the present disclosure;

FIG. 2C illustrates a structure of a balancing unit in a battery management system for a battery pack, in accordance with one embodiment of the present disclosure;

DETAILED DESCRIPTION

Figure 1:
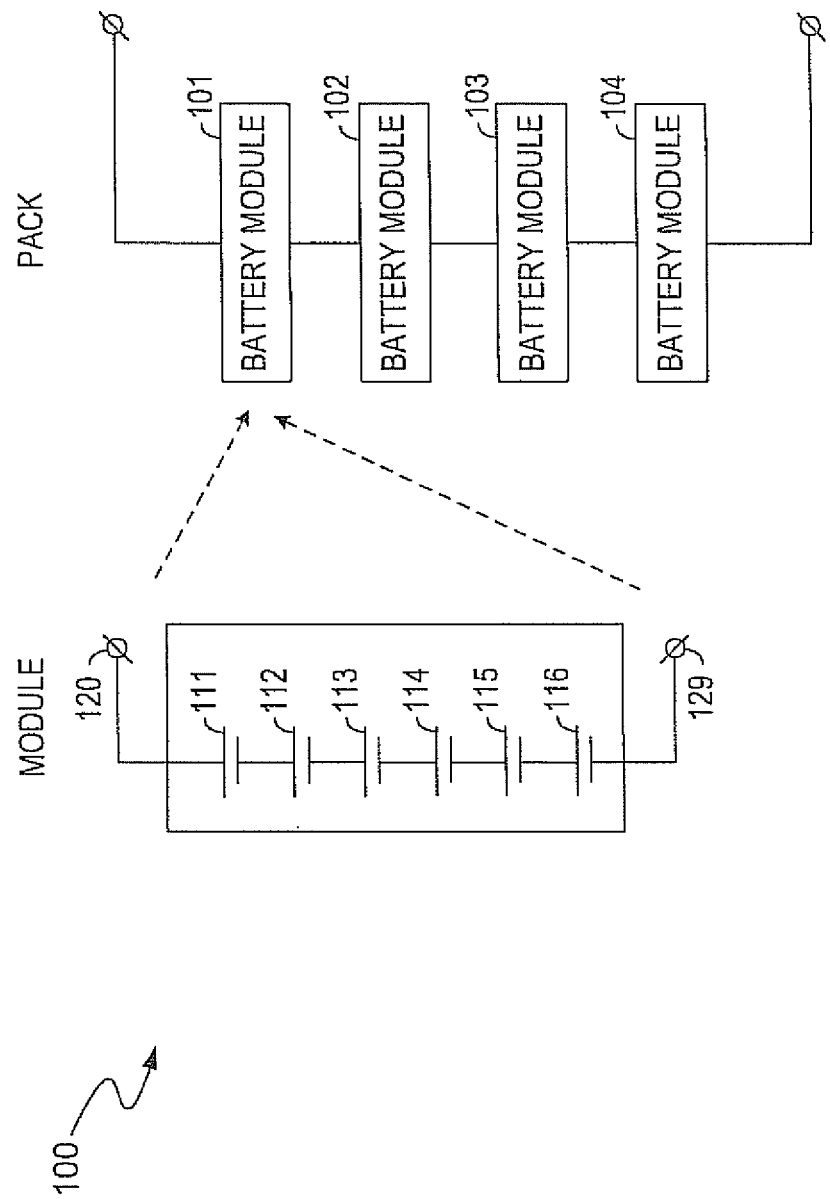
FIG. 1 illustrates a block diagram of a conventional lead-acid battery pack.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

In one embodiment, a battery management system for a battery pack can include multiple first controllers to sense voltages of multiple battery cells coupled in series and to control multiple first balancing circuits to adjust the voltages of the battery cells if an unbalance occurs between the battery cells. If an abnormal condition occurs, the first controllers can take measures to protect the corresponding battery cells. The battery management system can further include a second controller to sense voltages of multiple battery modules coupled in series and to control multiple second balancing circuits to adjust the voltages of the battery modules if an unbalance occurs between the battery modules. Due to the balancing technology used for the battery cells and the battery modules, the battery cells and/or modules are protected from being damaged. Hence, the economy of the battery management system can be improved and battery lifetime can be extended.

Figure 2A:
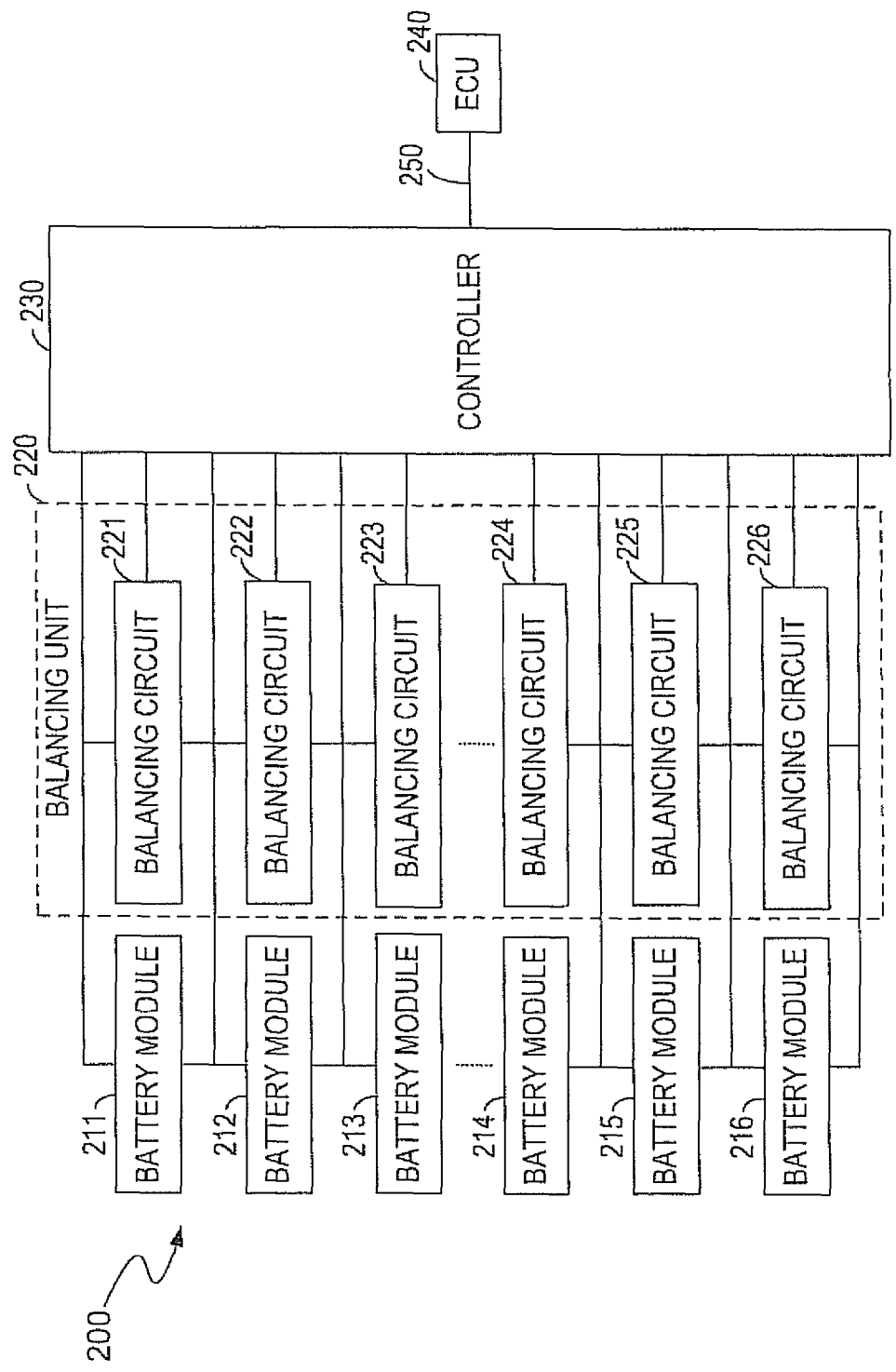
FIG. 2A illustrates a block diagram of a battery management system for a battery pack, in accordance with one embodiment of the present disclosure.

FIG. 2A illustrates a block diagram of a battery management system 200 for a battery pack, e.g., a lead-acid battery pack, in accordance with one embodiment of the present invention. Balancing technology is used to increase the lifetime of the battery pack and to improve the economy of the battery management system 200.

In one embodiment, the battery pack can include multiple battery modules, e.g., 211-216, coupled in series. Each of the battery modules 211-216 can further include multiple battery cells, e.g., 3, 4, 5, or 6 battery cells. Each battery cell may have a voltage of, for example, 2 volts, in which case the voltage of each battery module can be 6 volts, 8 volts, 10 volts, or 12 volts, depending on the number of battery cells. The battery pack is coupled to a balancing unit 220. In one embodiment, the balancing unit 220 can include multiple balancing circuits 221-226 coupled to the battery modules 211-216. Specifically, the balancing circuit 221 is coupled to the battery module 211, the balancing circuit 222 is coupled to the battery module 212, etc. The number of the battery cells, the battery modules and the balancing circuits is not limited and can vary based upon the requirements of different applications. For brevity and clarity, an example of 12-volt battery module will be described below in detail.

A controller 230 is coupled to the battery pack, e.g., the battery modules 211-216, and can monitor parameters, e.g., the voltages and/or the temperatures, of the battery modules 211-216. In one embodiment, the controller 230 can timely sense the voltages of the battery modules 211-216 and then calculate the voltage difference between the battery modules 211-216. The controller 230 can determine if an unbalance occurs based upon the voltage difference. When an unbalance occurs between the battery modules 211-216, the controller 230 can control the corresponding balancing circuits to adjust the voltages of the unbalanced battery modules. In one embodiment, the controller 230 can enforce a threshold $V_{THM}$ to determine if an unbalance occurs. If the voltage difference of the battery modules 211-216 is larger than the threshold, the controller 230 can determine that there is an unbalance.

Then the controller 230 can initiate the corresponding balancing circuits to control an adjustment of the voltages of the unbalanced battery modules.

In one embodiment, the voltages of the battery modules 211 and 212 sensed by the controller 230 are equal to $V_{M1}$ and $V_{M2}$, e.g., 12.4 volts and 12 volts, respectively. If the voltage difference $\Delta V_{M12}$ between the battery modules 211 and 212 is larger than the threshold $V_{THM}$, e.g., 0.1 volts, the controller 230 can determine that there is an unbalance between the battery modules 211 and 212. Under control of the controller 230, the balancing circuits 221 and 222 can adjust the voltages of the battery modules 211 and 212 to balance the battery modules 211 and 212, e.g., the voltage difference between the battery modules 211 and 212 is not larger than the threshold $V_{THM}$. In one embodiment, in a passive mode, the balancing circuit 221 can discharge the battery module 211 during a discharging period or bypass the battery module 211 in a charging period in one or more cycles until $\Delta V_{M12}$ is decreased to the threshold $V_{THM}$. In another embodiment, in an active mode, the energy of the battery module 211 can be transferred to the battery module 212 via a transformer (not shown) until $\Delta V_{M12}$ decreased to the threshold $V_{THM}$.

In one embodiment, if the unbalance occurs across multiple battery modules, the controller 230 calculates the voltage differences between those battery modules and prioritizes the voltage differences. For example, a voltage difference with the largest value can be given the highest priority, and a voltage difference with the smallest value can be given the lowest priority. If two or more voltage differences have the same values, these voltage differences can be given the same priority. Then the controller 230 can adjust the unbalanced battery modules according to the priority for thermal control purposes. In such an embodiment, if two or more voltage differences have the same priority, the controller 230 can control the corresponding balancing circuits concurrently to adjust the voltages of the unbalanced battery modules. In another embodiment, if the battery management system 200 has a cooler or fan to solve the thermal problem, the controller 230 will not determine and/or provide the priority of the voltage differences and can adjust all the unbalanced battery modules concurrently.

In one embodiment, an electronic control unit (ECU) 240 is coupled to the controller 230 via the bus 250 and can process data read from the controller 230. The data can include, but is not limited to, the voltages and/or the temperatures of the battery modules 211-216. The ECU 240 is provided with software control for managing the balancing of the battery pack. The ECU 240 can further display the data, and/or send the data to other devices (not shown) for further processing. The ECU 240 is optional. In one embodiment, the ECU 240 is omitted for cost-saving purposes.

Advantageously, the controller 230 can timely monitor the unbalance between the battery modules 211-216 and control the corresponding balancing circuits to adjust the voltages of the unbalanced battery modules. Hence, the measures mentioned above can be taken to protect the unbalanced battery modules from being damaged. As a result of the balancing technology used for the battery modules, the lifetime of the battery pack can be increased.

FIG. 2B illustrates a structure of a balancing circuit 200B in a battery management system for a battery pack, e.g., a lead-acid battery pack in a passive mode, in accordance with one embodiment of the present invention. FIG. 2B is described in combination with FIG. 2A. In one embodiment, the balancing circuits, e.g., 221-226, in FIG. 2A can employ the structure of the balancing circuit 200B.

In one embodiment, the balancing circuit 200B can include a resistor 281 and a switch 282 coupled in series. The balancing circuit 200B can be coupled to one of the battery modules in FIG. 2A. More specifically, a terminal of the resistor 281 can be coupled to a positive terminal of one battery module and a terminal of the switch 282 can be coupled to a negative terminal of the battery module. The switch 282 can be controlled by the controller 230.

In one embodiment, a first balancing circuit is coupled to a first battery module, and a second balancing circuit is coupled to a second battery module. The voltage of the first battery module is larger than that of the second battery module and there is an unbalance when the voltage difference between the first and second battery modules is larger than a threshold. The controller 230 turns on a first switch in the first balancing circuit and turns off a second switch in the second balancing circuit. In a discharging period, a discharging current can flow through a first resistor in the first balancing circuit, and hence the first balancing circuit can discharge the first battery module until a balance is reached between the first and second battery modules. In a charging period, a bypassing current can flow though the first resistor, and consequently the first balancing circuit can bypass the first battery module until a balance is reached between the first and second battery modules.

FIG. 2C illustrates a structure of a balancing unit 200C in a battery management system for a battery pack, e.g., a lead-acid battery pack in an active mode, in accordance with one embodiment of the present invention. In one embodiment, the balancing unit 200C can include a transformer. FIG. 2C is described in combination with FIG. 2A. In one embodiment, the balancing unit 200C can act as the balancing unit 220 in place of the balancing circuits 221-226 in FIG. 2A.

In one embodiment, the balancing unit 200C includes multiple secondary windings, e.g., 291-296, coupled to multiple switches 291A-296A in series. Each of the secondary windings 291-296 is coupled to a respective battery module, e.g., one of the battery modules 211-216. More specifically, the secondary winding 291 can be coupled to the battery module 211 via the switch 291A and the secondary winding 292 and can be coupled to the battery module 212 via the switch 292A, etc. The balancing unit 200C can further include a primary winding 290 coupled to a switch 290A in series. The primary winding 290 can be coupled to the battery pack via the switch 290A. All of the switches, e.g., 290A-296A, can be controlled by the controller 230.

In one embodiment, a first secondary winding is coupled to a first battery module via a first switch, and a second secondary winding is coupled to a second battery module via a second switch. The voltage of the first battery module is larger than that of the second battery module and there is an unbalance when the voltage difference between the first and second battery modules is larger than a threshold. The controller 230 turns on the first switch and turns off other switches and hence the energy of the first battery module is stored on the first secondary winding. In one embodiment, the controller 230 turns on the second switch and turns off other switches and hence the energy on the first secondary winding is transferred to the second secondary winding. In another embodiment, the controller 230 turns on the switch 290A and turns off other switches and hence the energy on the first secondary winding is transferred to the primary winding 290. The energy on the primary winding 290 can be shared by all of the battery modules 211-216. The processing above can be repeated until a balance is achieved.

Figure 3:
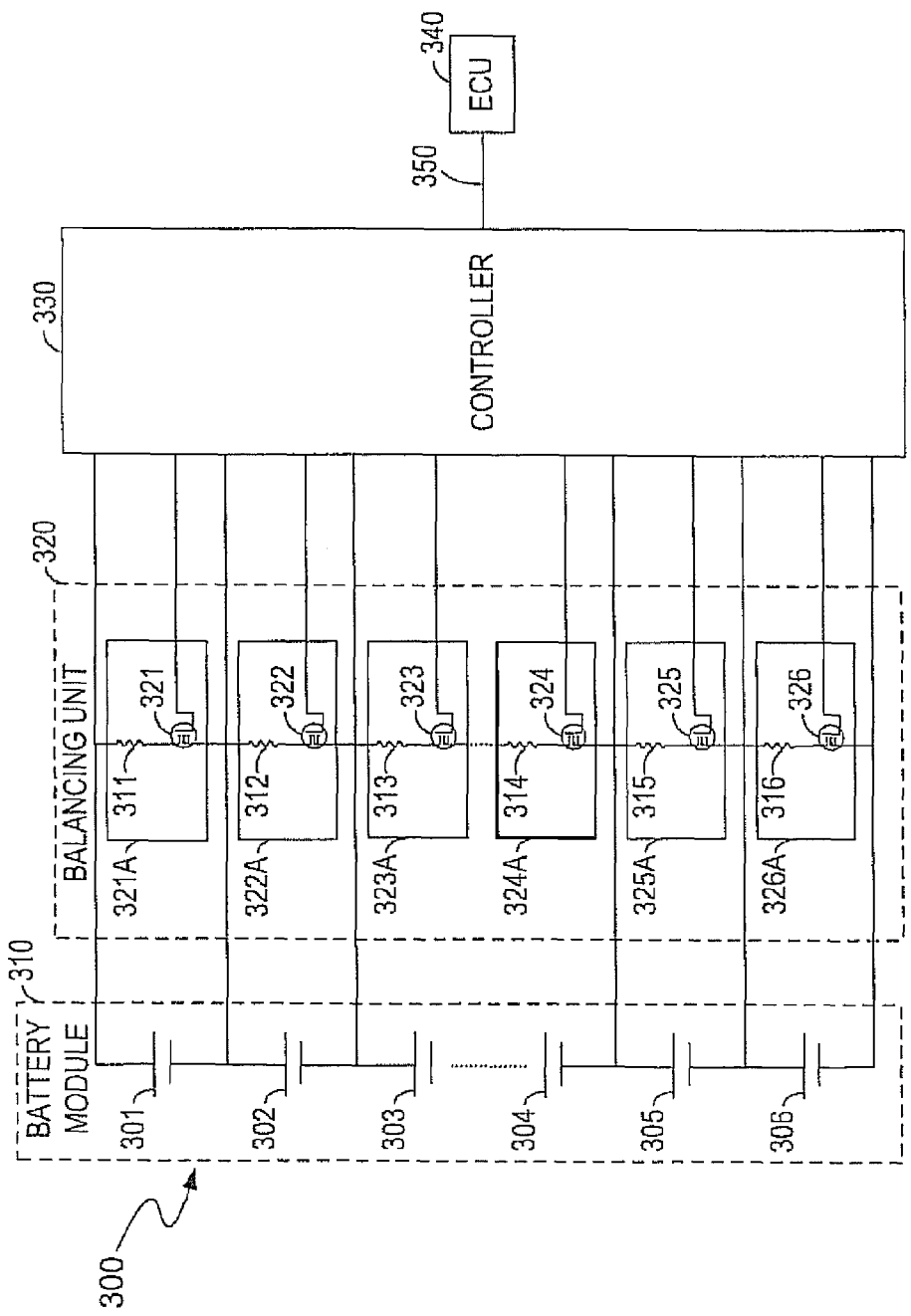
FIG. 3 illustrates a block diagram of a battery management system for a battery pack, in accordance with another embodiment of the present disclosure.

FIG. 3 illustrates a block diagram of a battery management system 300 for a battery pack, e.g., a lead-acid battery pack, in accordance with another embodiment of the present invention. Balancing technology is employed to increase the lifetime of the battery pack and to improve the economy of the battery management system 300.

In one embodiment, the battery pack includes multiple battery modules coupled in series (not shown). FIG. 3 illustrates one of the battery modules, e.g., a battery module 310. The battery module 310 can further include multiple battery cells, e.g., 301-306. The battery cells 301-306 are coupled to a balancing unit 320. In one embodiment, the balancing unit 320 can include multiple balancing circuits, e.g., 321A-326A, which can employ the structure of the balancing circuit 200B in FIG. 2B. Specifically, the balancing circuits 321A-326A can include a resistor, e.g., 311-316, and a switch, e.g., 321-326, coupled in series. The number of the battery cells, the battery modules and the balancing circuits herein is not limited and can vary based upon the requirements of different applications. An example of a 2-volt battery cell will be described below in detail.

A controller 330 is coupled to the battery module 310, e.g., the battery cells 301-306, and can monitor parameters, e.g., the voltages and/or the temperatures, of the battery cells 301-306. In one embodiment, the controller 330 can timely sense the voltages of the battery cells 301-306 and then calculate the voltage difference between the battery cells 301-306. When an unbalance occurs between the battery cells 301-306, the controller 330 can control the corresponding balancing circuits 321A-326A to adjust the voltages of the unbalanced battery cells. In one embodiment, the controller 330 can enforce a threshold $V_{THC}$ to determine if an unbalance occurs. If the voltage difference of the battery cells 301-306 is larger than the threshold, the controller 330 can determine that there is an unbalance. Then the controller 330 can initiate the corresponding balancing circuits to control an adjustment of the voltages of the unbalanced battery cells.

In one embodiment, the voltages of the battery cells 301 and 302 sensed by the controller 330 are equal to $V_{C1}$ and $V_{C2}$, e.g., 2.1 volts and 2.0 volts, respectively. If the voltage difference $\Delta V_{C12}$ between the battery cells 301 and 302 is larger than the threshold $V_{THC}$, e.g., 0.02 volts, the controller 330 can determine that there is an unbalance between the battery cells 301 and 302. In this condition, the controller 330 can control the balancing circuits 321A and 322A to adjust the voltages of the battery cells 301 and 302 until a balance between the battery cells 301 and 302 is reached, e.g., the voltage difference between the battery cells 301 and 302 is not larger than the threshold $V_{THC}$. In one embodiment, in a passive mode, the balancing circuit 321A can discharge the battery cell 301 in a discharging period or bypass the battery cell 301 in a charging period until $\Delta V_{C12}$ decreases to the threshold $V_{THC}$. More specifically, in this condition, the controller 330 can send a control signal to the switch 321 and then the switch 321 is turned on in one or more cycles. Hence, a current can flow through the resistor 311 and the switch 321 and as a result, $V_{C1}$ can be reduced. Once $V_{C1}$ is reduced to achieve a balance between the battery cells 301 and 302, the controller 330 can turn off the switch 321 to stop the discharging or bypassing of the battery cell 301.

In one embodiment, if the unbalance occurs across multiple battery cells, the controller 330 can calculate the voltage differences between those battery cells and prioritize the voltage differences. Then the controller 330 can adjust the unbalanced battery cells according to the priority for thermal control purposes. If two or more voltage differences have the same priority, the controller 330 can control the corresponding balancing circuits concurrently to adjust the voltages of the unbalanced battery cells. In another embodiment, the controller 330 will not determine and/or provide the priority of the voltage differences and can adjust all the unbalanced battery cells concurrently if the battery management system 300 has a cooler or fan to solve the thermal problem.

If an abnormal condition occurs, the controller 330 can generate an alert signal, and an electronic control unit (ECU) 340 can read the alert signal via a bus 350. The controller 330 can identify an abnormal condition that can include, but is not limited to, an over-voltage (OV) condition, an under-voltage (UV) condition, or an over-temperature (OT) condition. When the abnormal condition occurs, the controller 330 can take certain measures to protect the corresponding battery cell.

In one embodiment, if an OV condition occurs, the controller 330 can control the corresponding balancing circuit to disable the charging of the OV battery cell. If an UV condition occurs, the controller 330 can control the corresponding balancing circuit to disable the discharging of the UV battery cell. If an OT condition occurs, the controller 330 can control the corresponding balancing circuit to reduce the charging or discharging current of the OT battery cell, or even to stop the charging or discharging of the OT battery cell. The number of the battery cells with an abnormal condition can vary when the battery management system 300 is in operation. If an abnormal condition occurs to multiple battery cells, the controller 330 can control the corresponding balancing circuits concurrently to further improve the efficiency of the battery management system 300.

The ECU 340 is coupled to the controller 330 via the bus 350 and can process data read from the controller 330. The data can include, but is not limited to, the voltages and/or the temperatures of the battery cells 301-306, and the alert signal indicating an abnormal condition. The ECU 340 is provided with software control for the balancing management of the battery pack. The ECU 340 can further display the data, and/or send the data to other devices (not shown) for further processing. The ECU 340 is optional. In one embodiment, the ECU 340 is omitted for cost-saving purposes.

In one embodiment, with reference also to both FIG. 2C and FIG. 3, the balancing unit 200C can replace all of the balancing circuits including the balancing unit 320, e.g., the balancing circuits 321A-326A, in an active mode. A first secondary winding is coupled to a first battery cell via a first switch, and a second secondary winding is coupled to a second battery cell via a second switch. The voltage of the first battery cell is larger than that of the second battery cell and there is an unbalance when the voltage difference between the first and second battery cells is larger than a threshold. The controller 330 turns on the first switch and turns off other switches and hence the energy of the first battery cell is stored on the first secondary winding. In one embodiment, the controller 330 turns on the second switch and turns off other switches and hence the energy on the first secondary winding is transferred to the second secondary winding. In another embodiment, the controller 330 turns on the switch 290A and turns off other switches and hence the energy on the first secondary winding is transferred to the primary winding 290. The energy on the primary winding 290 can be shared by all of the battery cells 301-306. The processing above can be repeated until a balance is achieved.

Advantageously, the controller 330 can timely monitor the unbalance between the battery cells 301-306 and control the corresponding balancing circuits to adjust the voltages of the unbalanced battery cells. Hence, the measures mentioned above can be taken to protect the unbalanced battery cells from being damaged. The controller 330 can detect an abnormal condition in the battery cells 301-306 and then can take the above-mentioned measures to protect each battery cell and extend the battery lifetime. Consequently, the lifetime of the battery pack can be increased.

Figure 4:
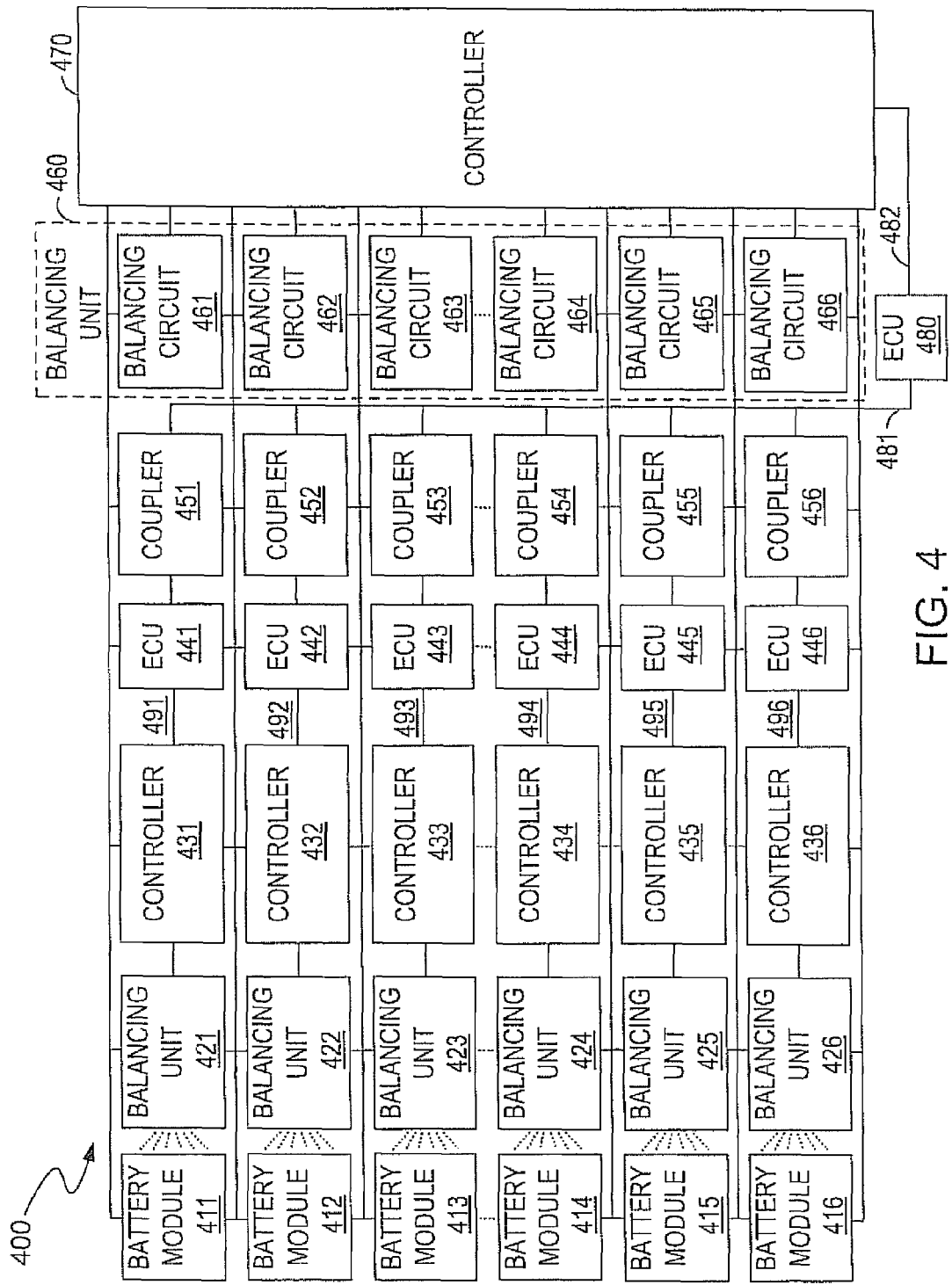
FIG. 4 illustrates a block diagram of a battery management system for a battery pack, in accordance with another embodiment of the disclosure.

FIG. 4 illustrates a block diagram of a battery management system 400 for a battery pack, e.g., a lead-acid battery pack, in accordance with another embodiment of the invention. Balancing technology for battery cells and balancing technology for battery modules are used in the battery management system 400 to extend the lifetime of the battery pack and to facilitate the balancing rate if any unbalance occurs. FIG. 4 is described in combination with FIG. 2A, FIG. 2B, FIG. 2C and FIG. 3. The elements in FIG. 4 labeled similar to those in other figures have similar functions.

In one embodiment, the battery pack can include multiple battery modules, e.g., 411-416. Each of the battery modules can consist of multiple battery cells coupled in series (not shown in FIG. 4). An example of the battery module 411 will be described below. Each of the battery cells in the battery module 411 is coupled to a respective balancing circuit in a balancing unit 421. In one embodiment, the balancing unit 421 can employ the structure of the balancing unit 320 in FIG. 3. In another embodiment, the balancing unit 421 can employ the structure of the balancing unit 200C in FIG. 2C.

A controller 431 is coupled to the battery cells in the battery module 411 and can monitor parameters, e.g., the voltages and/or the temperatures, of the battery cells. The controller 431 can act as a front-end module. When an abnormal condition occurs in one battery cell, the controller 431 can control the corresponding balancing circuit to protect the abnormal battery cell and generate an alert signal to an electronic control unit (ECU) 441 via a bus 491. If an abnormal condition occurs in multiple battery cells, the controller 431 can control the corresponding balancing circuits concurrently to protect the corresponding battery cells so as to improve the efficiency of the battery management system 400.

The controller 431 can timely sense the voltages of the battery cells in the battery module 411. When an unbalance occurs between the battery cells in the battery module 411, the controller 431 can control the corresponding balancing circuits to adjust the voltage of the unbalanced battery cells by discharging or bypassing the corresponding battery cells or transferring energy between the corresponding battery cells.

The ECU 441 is coupled to the controller 431 via the bus 491 and can process data received from the controller 431. The ECU 441 can further display the data. In one embodiment, the ECU 441 can transfer the data to an ECU 480 via a coupler 451 for further processing. The coupler 451 is used to isolate the communication between a low-voltage side, e.g., the ECU 480, and a high-voltage side, e.g., the ECU 441, to protect the ECU 480 from being damaged by the higher voltage.

In one embodiment, the controller 431 can be coupled to a battery cell in other battery modules (not shown), e.g., the first battery cell, in the battery module 412. Hence, the controller 431 can sense the voltages of the first battery cell in the battery module 412 and the battery cells in the battery module 411 concurrently. If an abnormal condition occurs or an unbalance occurs between the first battery cell in the battery module 412 and the battery cells in the battery module 411, the controller 431 can settle this issue using the above-mentioned measures.

In one embodiment, if the unbalance occurs across multiple battery cells, the controller 431 can control the corresponding balancing circuits to adjust the voltages of the unbalanced battery cells according to a priority of the voltage differences between the battery cells for thermal control purposes. In another embodiment, the controller 431 will not determine and/or provide the priority of the voltage differences and can adjust all the unbalanced battery cells concurrently if a cooler or fan is included to solve the thermal problem. If the abnormal condition occurs to multiple battery cells, the controller 431 can take measures as described previously concurrently to protect the corresponding battery cells so as to improve the efficiency of the battery management system 400.

The controller 470 is coupled to a balancing unit 460, e.g., multiple balancing circuits, e.g., 461-466, and can timely sense the voltages of the battery modules 411-416. In one embodiment, the balancing circuits 461-466 can employ the structure of the balancing circuit 200B in FIG. 2B and implement similar functions as previously described herein. In another embodiment, the balancing unit 460 can employ the structure of the balancing unit 200C in FIG. 2C and implement similar functions as previously described herein. When an unbalance occurs between two of the battery modules 411-416, the controller 470 can control the corresponding balancing circuits 461-466 to adjust the unbalanced battery modules. In one embodiment, if the unbalance occurs across multiple battery modules, the controller 470 can control the corresponding balancing circuits to adjust the voltages of the unbalanced battery modules according to a priority of the voltage differences between the battery modules for thermal control purposes. In another embodiment, the controller 470 will not determine and/or provide the priority of the voltage differences and can adjust all the unbalanced battery modules concurrently if a cooler or fan is included to solve the thermal problem.

The ECU 480 is coupled to the controller 470 via a bus 482 and can process data read from the controller 470. The ECU 480 can further display the data, and/or send the data to other devices (not shown) for further processing. Advantageously, balancing technology for the battery cells and balancing technology for the battery modules are employed to increase the efficiency of the battery management system 400 when an unbalance occurs. Hence, the corresponding battery cells or the corresponding battery modules are protected against damage. Consequently, the lifetime of the battery pack can be expanded.

The ECUs 441-446, the balancing circuits 461-466, the controller 470, and the ECU 480 included in the battery management system 400 are optional. In one embodiment, the balancing circuits 461-466 and the controller 470 are omitted and the corresponding functions are implemented by software. For example, the ECU 480 can read data from the controllers 431-436 via the ECUs 441-446, and the controllers 431-436 can take the measures described above to solve different issues. The bus 482 can be omitted in this condition. In another embodiment, the ECUs 441-446, the balancing circuits 461-466, the controller 470, and the ECU 480 are omitted, and the controllers 431-436 can take the measures described above to solve different issues.

Figure 5:
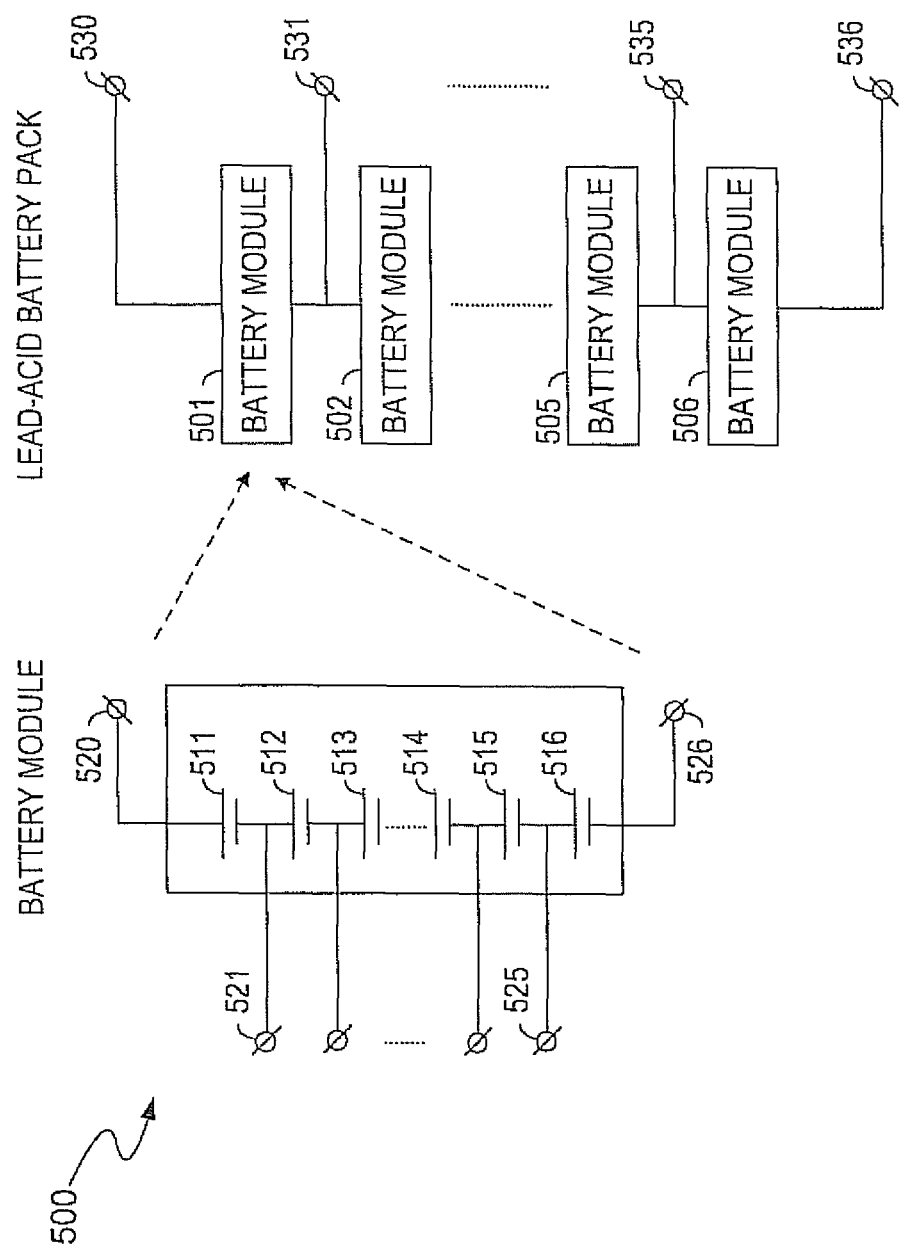
FIG. 5 illustrates a structure of a battery pack, in accordance with one embodiment of the present disclosure.

FIG. 5 illustrates a battery pack 500, e.g., a lead-acid battery pack, in accordance with one embodiment of the present invention. In one embodiment, the battery management system 200, 300, or 400 is employed for the battery pack 500. The battery pack 500 can include multiple battery modules, e.g., 501-506, coupled in series. Each battery module has two electrodes. The voltage of each of the battery modules 501-506 can be monitored via the two electrodes. For example, the battery module 501 can be monitored via electrodes 530 and 531, and the battery module 506 can be monitored via electrodes 535 and 536.

In one embodiment, each battery module includes multiple battery cells, e.g., 511-516, coupled in series. Each battery cell has two electrodes. The voltage of each of the battery cells 511-516 can be monitored via the two electrodes. For example, the battery cell 511 can be monitored via electrodes 520 and 521, and the battery cell 516 can be monitored via electrodes 525 and 526.

Figure 6:
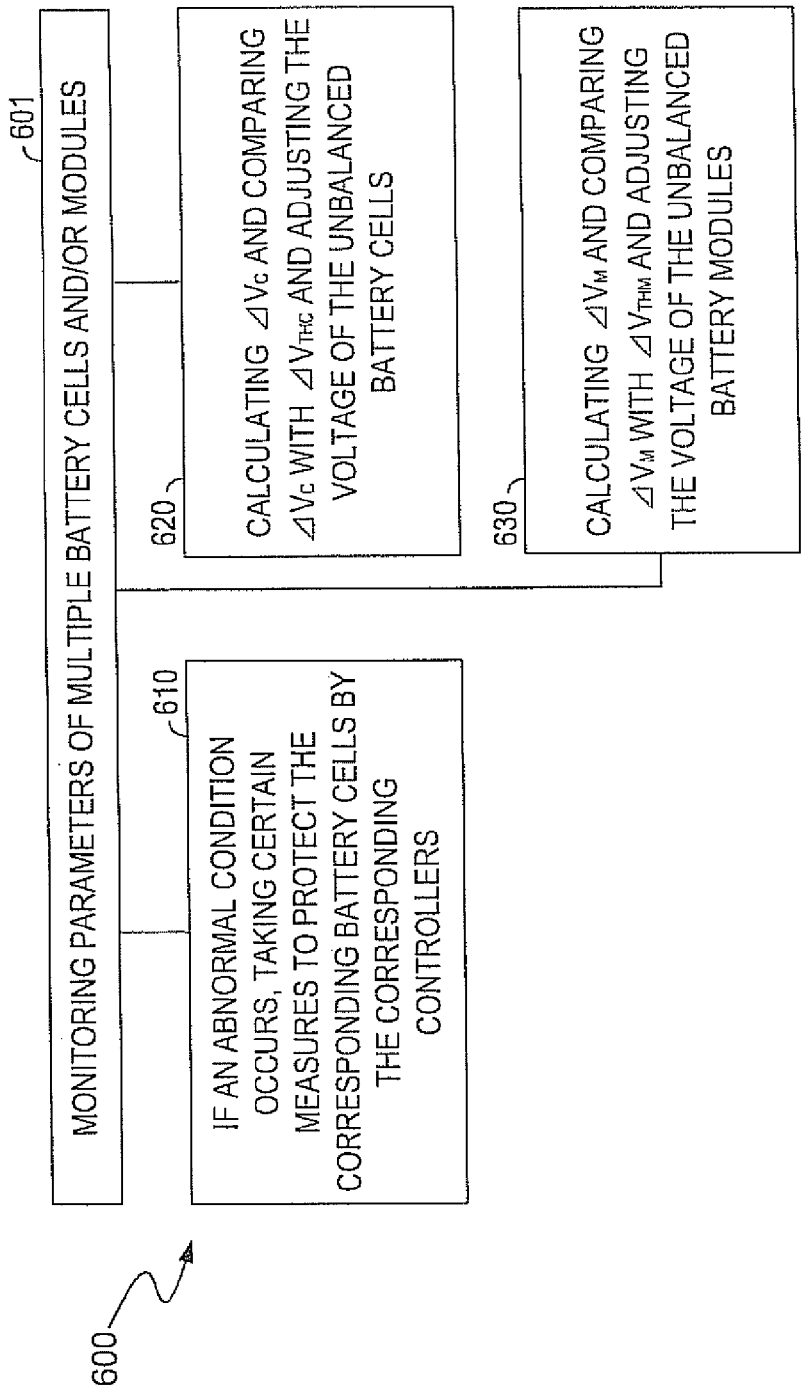
FIG. 6 illustrates a flowchart of operations performed by a battery management system for a battery pack, in accordance with one embodiment of the present disclosure.

FIG. 6 illustrates a flowchart 600 of operations performed by a battery management system for a battery pack, in accordance with one embodiment of the present invention. FIG. 6 is described in combination with FIG. 4.

In block 601, the controllers 431-436 can monitor parameters, e.g., the voltages and/or temperatures, of the battery cells in the battery modules 411-416. The controller 470 can monitor parameters, e.g., the voltages and/or temperatures, of the battery modules 411-416.

In block 610, if an abnormal condition occurs to the battery cells, the controllers 431-436 can take certain measures to protect the corresponding battery cells. If an OV condition occurs, the controllers 431-436 can control the corresponding balancing units 421-426 to disable the charging of the OV battery cells. If a UV condition occurs, the controllers 431-436 can control the corresponding balancing units 421-426 to disable the discharging of the UV battery cells. If an OT condition occurs, the controllers 431-436 can control the corresponding balancing units 421-426 to reduce the charging or discharging current of the OT battery cell, or to stop the charging or discharging of the OT battery cell. Advantageously, the controllers 431-436 can control the corresponding balancing units 421-426 concurrently to improve the efficiency of the battery management system 400.

In block 620, the controllers 431-436 can calculate the voltage differences between the battery cells, e.g., $\Delta V_C$, and compare $\Delta V_C$ with a threshold $V_{THC}$. If $\Delta V_C$ is larger than $V_{THC}$, an unbalance occurs. In one embodiment, the controllers 431-436 can control the balancing circuits in the balancing units 411-416 to adjust the voltages of the unbalanced battery cells according to a priority of the voltage differences for thermal control purposes until a balance is achieved. In another embodiment, the controller 431-436 can adjust the unbalanced battery cells concurrently if a cooler or fan is included to solve the thermal problem.

More specifically, in a passive mode, the corresponding balancing circuit can discharge the battery cell with the higher voltage in a discharging period or bypass the battery cell with the higher voltage in a charging period in one or more cycles, until $\Delta V_C$ is decreased to the threshold $V_{THC}$. In an active mode, the energy of the battery cell with the higher voltage can be transferred to the battery cell with the lower voltage via a transformer (not shown) until $\Delta V_C$ is decreased to the threshold $V_{THC}$.

In block 630, the controller 470 can calculate the voltage differences between the battery modules, e.g., $\Delta V_M$, and compare $\Delta V_M$ with a threshold $V_{THM}$. If $\Delta V_M$ is larger than $V_{THM}$, an unbalance occurs. In one embodiment, the controller 470 can control the corresponding balancing circuits 461-466 to adjust the voltages of the unbalanced battery modules according to a priority of the voltage differences for thermal control purposes until a balance is achieved. In another embodiment, the controller 470 can adjust the unbalanced battery modules concurrently if the cooler or fan is included to solve the thermal problem.

More specifically, in a passive mode, the corresponding balancing circuits can discharge the battery module with the higher voltage in a discharging period, or bypass the battery module with the higher voltage in a charging period, in one or more cycles until $\Delta V_M$ is decreased to the threshold $V_{THM}$. In an active mode, the energy of the battery module with the higher voltage can be transferred to the battery module with the lower voltage via a transformer (not shown) until $\Delta V_M$ is decreased to the threshold $V_{THM}$.

Advantageously, balancing technology can be employed to adjust the voltages of multiple battery cells and/or modules according to a priority of the voltage differences or concurrently to improve the efficiency of the battery management system 400.

Figure 7:
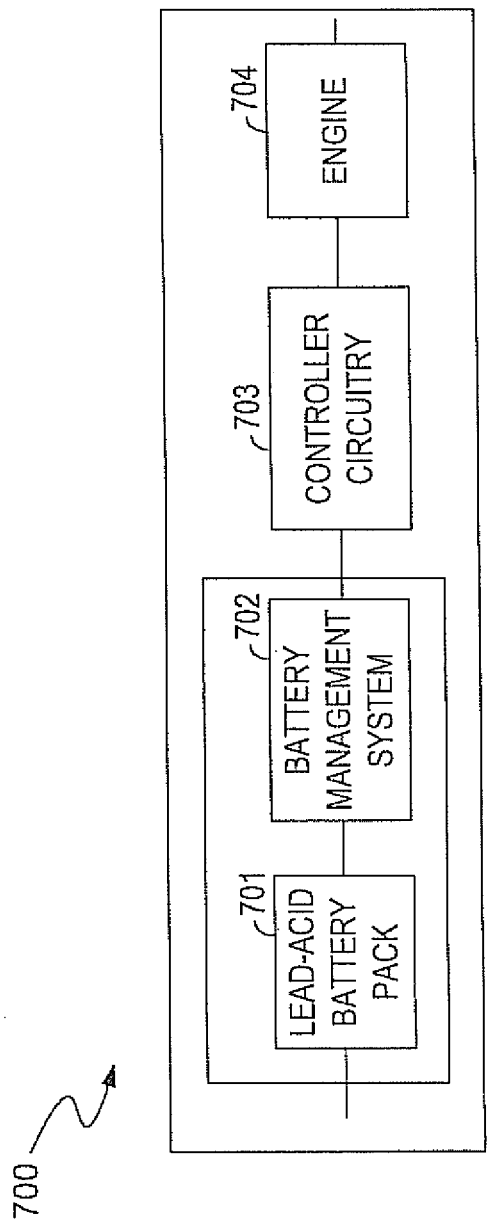
FIG. 7 illustrates a block diagram of elements of an electric vehicle, in accordance with one embodiment of the present disclosure.

FIG. 7 illustrates a block diagram of an electric vehicle 700 (e.g., an automobile), in accordance with one embodiment of the present invention. FIG. 7 is described in conjunction with the other figures. The electric vehicle 700 can include other well-known components in addition to those shown.

In one embodiment, the electric vehicle 700 can include a lead-acid battery pack 701, a battery management system 702, a controller circuitry 703 and an engine 704. The lead acid battery pack 701 is not a limitation; other types of battery pack may be used. A battery management system, e.g., 200, 300, or 400, can be employed as the battery management system 702. In one embodiment, the battery management system 702 and the lead-acid battery pack 701 can be integrated into a single integrated circuit (IC). The controller circuitry 703 can control the power supply from the lead-acid battery pack 701 to the engine 704. The engine 704 can provide energy to the electric vehicle 700.

Advantageously, the battery management system 702 employs the balancing technology to timely balance multiple battery cells and/or multiple battery modules, and hence the lead-acid battery pack 701 can be protected from being damaged if an unbalance occurs. Hence, the lifetime of the lead-acid battery pack 701 can be increased and the reliability of the electric vehicle 700 can be enhanced.

Figure 8:
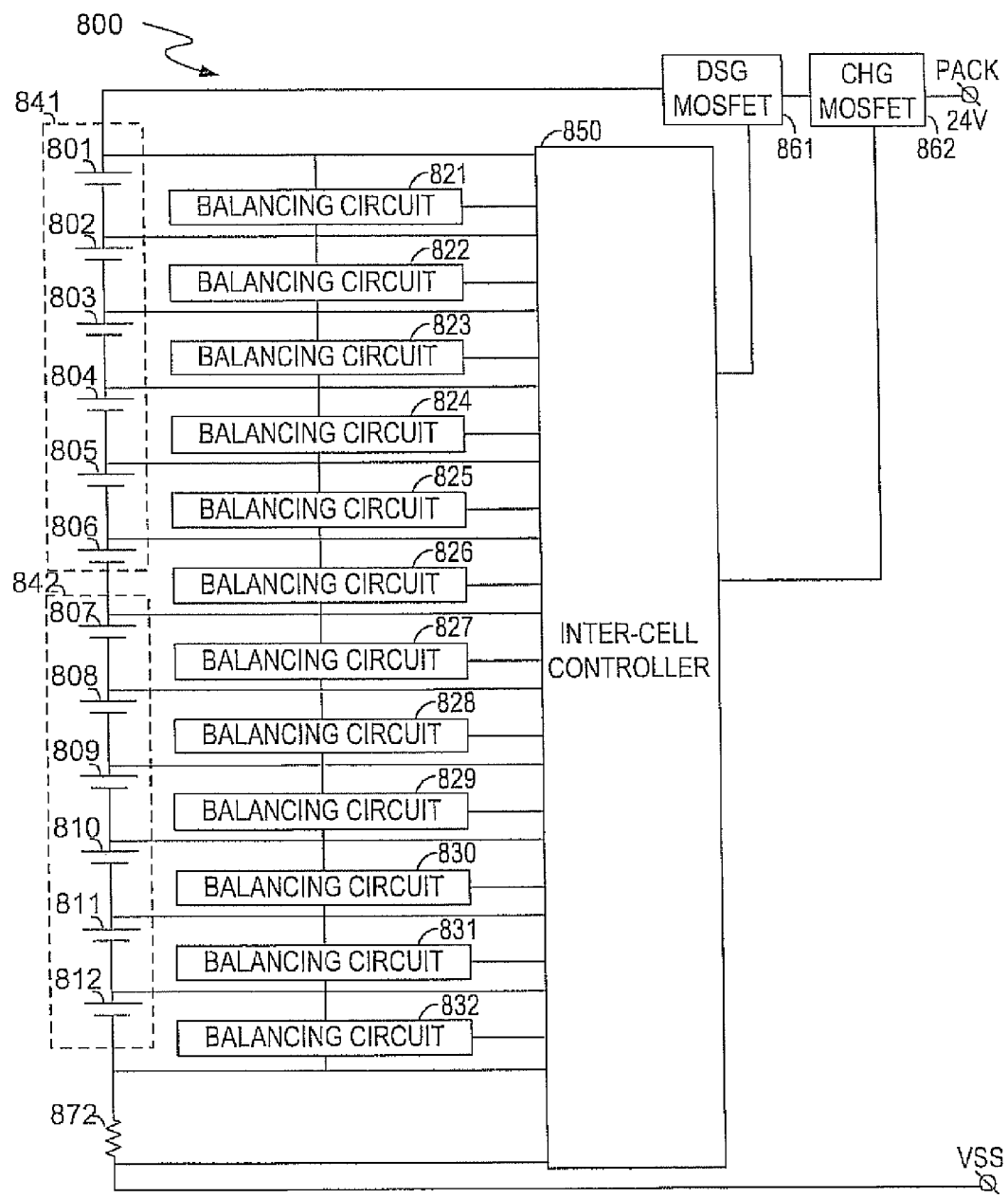
FIG. 8 illustrates a block diagram of a battery management system for a battery pack, in accordance with another embodiment of the present disclosure.

FIG. 8 illustrates a block diagram of a battery management system 800 for a battery pack, e.g., a lead-acid battery pack, in accordance with another embodiment of the present invention. An inter-cell controller 850 is used to increase the lifetime of the battery pack and reduce the cost of the battery pack. FIG. 8 is described with FIG. 2B.

In one embodiment, the battery pack can include one or more battery modules coupled in series. In the example of FIG. 8, the battery pack can include two battery modules 841 and 842 coupled in series. Battery module 841 can include six battery cells 801-806, and battery module 842 can include six battery cells 807-812 as illustrated in FIG. 8. Each of the battery cells 801-812 is coupled to a respective balancing circuit. In one embodiment, each of the balancing circuits 821-832 can employ the structure of the balancing circuit 200B in FIG. 2B. More specifically, a balancing circuit can include a resistor, e.g., 281, and a switch, e.g., 282, coupled in series. The number of battery cells, battery modules and balancing circuits herein is not limited and can vary based on the requirements of different applications. An example of 2-volt battery cell will be described below in detail.

An inter-cell controller 850 is coupled to the balancing circuits 821-832, and the battery cells 801-812 and can monitor parameters, e.g., the voltages, current and/or the temperatures of the battery cells 801-812, control the balancing circuits 821-832 when an unbalanced condition occurs, and further trigger a protection action when an abnormal condition occurs. In one embodiment, the inter-cell controller 850 can monitor the voltages of the battery cells 801-812, and then can calculate the difference between any two of the battery cells 801-812 in the battery modules 841 and 842. In this situation, the inter-cell controller 850 can determine if an unbalance occurs between any two of the battery cells, even if the battery cells are in different battery modules. As a result, the efficiency of cell balancing can be improved. When an unbalance occurs between any two of the battery cells 801-

812, the inter-cell controller 850 can control the corresponding balancing circuits 821-832 to adjust the voltages of the battery cells. In one embodiment, the unbalance can be detected by inter-cell controller 850. For example, the inter-cell controller 850 can enforce a threshold $V_{TH1}$ to determine if an unbalance occurs. If a voltage difference between any two cells of the battery cells 801-812 is larger than the threshold $V_{TH1}$, the inter-cell controller 850 determines that there is an unbalance. The intercell controller 850 can initiate the corresponding balancing circuit to control an adjustment of the voltages of the unbalanced battery cells.

By way of example, the voltages of the battery cells 801 in the battery module 841 and 807 in the battery module 842 sensed by the inter-cell controller 850 are equal to $V_1$ and $V_2$, e.g., 2.1 volts and 2.0 volts, respectively. If the voltage difference between the battery cells 801 and 807 $\Delta V_{12}$ is larger than the threshold $V_{TH1}$, e.g., 0.02 volts, the inter-cell controller 850 determines that an unbalance occurs between the battery cells 801 and 807. In this condition, the inter-cell controller 850 can control the balancing circuits 821 and 827 until a balance between the battery cells 801 and 807 is reached, e.g. the voltage difference between the battery cells 801 and 807 is not larger than the threshold $V_{TH1}$. In one embodiment, in a passive mode, the balancing circuit 821 can discharge the battery cell 801 in a discharging period or bypass the battery cell 801 in a charging period until $\Delta V_{12}$ decreases to the threshold $V_{TH1}$. Each of the balancing circuits 821-832 can employ the structure of the balancing circuit in FIG. 2B. The inter-cell controller 850 can send a control signal to the switch 282 included in the balancing circuit 821 and the switch 282 in the balancing circuit 821 can be turned on in one or more cycles. Hence, in a discharging period, a discharging current can flow through the resistor 281 and the switch 282 included in the balancing circuit 821. As a result, $V_1$ can be reduced. In a charging period, a charging current can flow through the resistor 281 and the switch 282 included in the balancing circuit 821. Once $\Delta V_{12}$ is not larger than $V_{TH1}$, a balance is achieved between the battery cells 801 and 807, and the inter-cell controller 850 can turn off the switch 282 in the balancing circuit 821 so as to stop discharging or bypassing the battery cell 801.

If the unbalance occurs across multiple battery cells, the inter-cell controller 850 can calculate the voltage differences between those multiple battery cells and prioritize the voltage differences. In one embodiment, the largest voltage difference can be given the highest priority and the smallest voltage difference can be given the lowest priority and, accordingly, the greater the voltage differences, the higher the priority. The inter-cell controller 850 can adjust the unbalanced battery cells according to their respective priority. If two or more voltage differences have the same priority, the inter-cell controller 850 can control the corresponding balancing circuits concurrently to adjust the voltages of the unbalanced cells. In another embodiment, the inter-cell controller 850 will not determine and/or provide the priority of the voltage differences and can adjust all the unbalanced battery cells concurrently if a cooler or fan is included to solve the thermal problem.

Moreover, the inter-cell controller 850 can monitor the parameters of each of the battery cells 801-812, e.g. current, voltage and temperature. The inter-cell controller 850 can also detect abnormal conditions including, but not limit to an over voltage (OV) condition, an under voltage (UV) condition, an over temperature (OT) condition, a discharge over current (DOC) condition and a charging over current (COC) condition. If an abnormal condition occurs, the inter-cell controller 850 can generate a control signal to turn off a discharge switch 861 in the lead-acid battery pack and/or generate a control signal to turn off a charge switch 862 in the lead acid battery pack to terminate discharging or charging of the battery cells 801-812.

In one embodiment, the inter-cell controller 850 can monitor the voltages of each of the battery cells 801-812, and compare these voltages with the predetermined thresholds $V_{OV}$ and $V_{uv}$ set by the inter-cell controller 850 and determine if an over voltage condition or an under voltage condition occurs. The inter-cell controller 850 can also monitor the voltage of sense resistor 872, and compare the voltage with the predetermined thresholds $V_{COC}$ and $V_{DOC}$ set by the inter-cell controller 850 and determine if a charging over current condition or a discharge over current condition occurs. The inter-cell controller 850 can also monitor the voltage of a thermistor (not shown in the FIG. 8) coupled to each of the cells 801-812 and compare the voltage with a predetermined thresholds $V_{OT}$ set by the inter-cell controller 850 to determine if an over temperature condition occurs. If one of these cell voltages is larger than the predetermined threshold $V_{OV}$, an over voltage (OV) condition occurs, and the inter-cell controller 850 can generate a control signal to turn off the charge switch 862 to terminate charging of the battery cells 801-812. If one of these cell voltages is less than the predetermined threshold $V_{UV}$, an under voltage (UV) condition occurs, and the inter-cell controller 850 can generate a control signal to turn off the discharging switch 861 to terminate discharging of the battery cells 801-812. If the voltage of sense resistor 872 is larger than the predetermined threshold $V_{COC}$ during a charging period, then a charging over current (COC) condition occurs, and the inter-cell controller 850 can generate a control signal to turn off the charging switch 862 to terminate charging of the battery cells 801-812. If the voltage of sense resistor R1 is larger than the predetermined threshold $V_{DOC}$ during a discharging period, a discharge over current (DOC) condition occurs, and the inter-cell controller 850 can generate a control signal to turn off the discharging switch 861 to terminate discharging of the battery cells 801-812. If the voltage of thermistor is larger than the predetermined threshold $V_{OT}$, an over temperature (OT) condition occurs, and the inter-cell controller 850 can generate a control signal to turn off the discharging switch 861 and/or the charging switch 862 to terminate discharging and/or charging of the battery cells 801-812.

Advantageously, the inter-cell controller 850 can monitor the unbalance between the battery cells 801-812 in the battery pack, calculate the difference between any two of the battery cells 801-812 even in different battery modules, and control the corresponding balancing circuits to adjust the voltages of the unbalanced battery cells. Furthermore, the inter-cell controller 850 can detect abnormal conditions occurs to the battery cells 801-812 and generate a control signal to turn off the discharge switch 861 and/or the charge switch 862 to terminate discharging and/or charging of the battery cells 801-812 for protecting the battery cells from damaged. Consequently, the battery lifetime of the battery pack can be increased.

Figure 9:
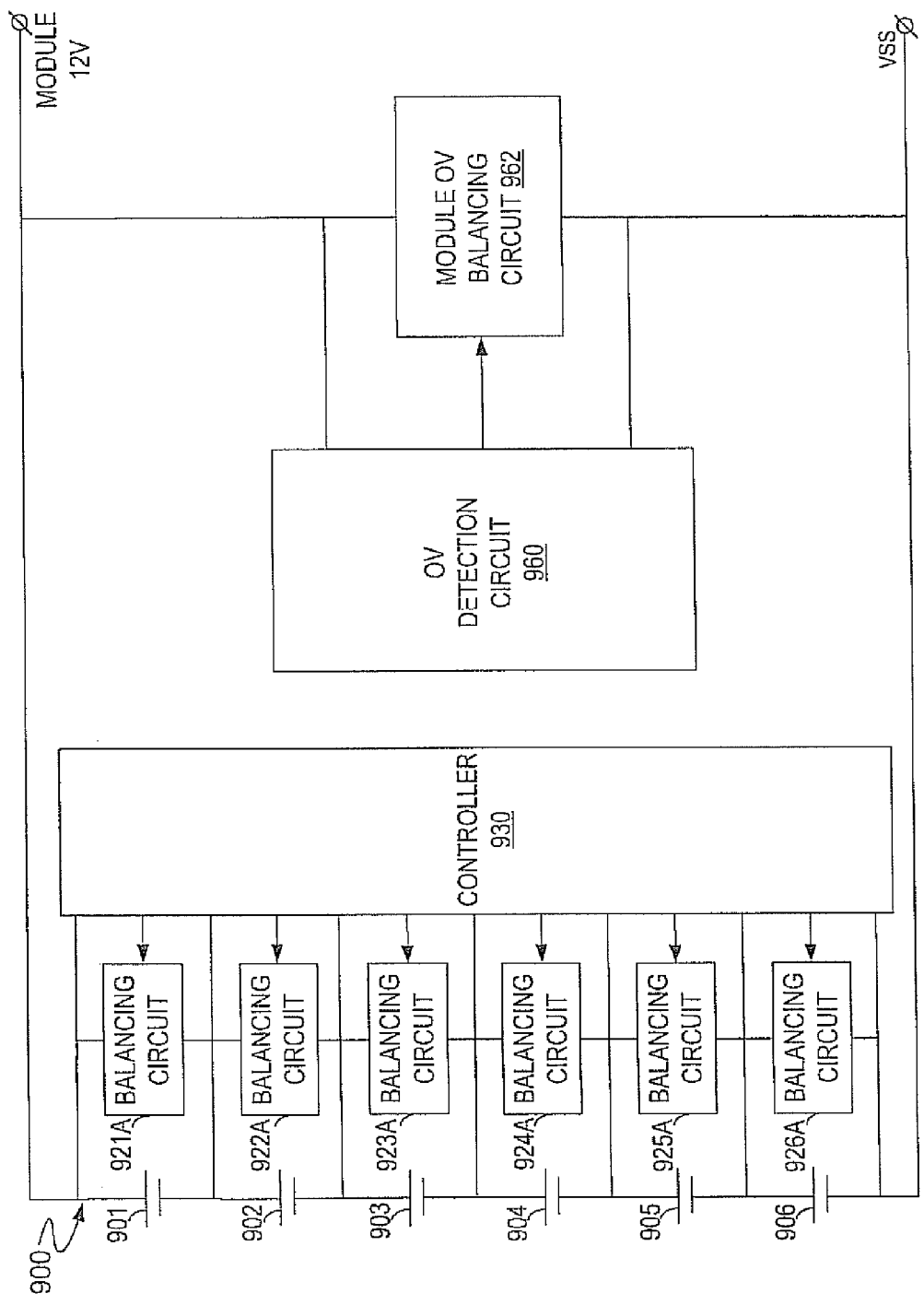
FIG. 9 illustrates a block diagram of a battery management system for a battery pack, in accordance with another embodiment of the present disclosure.

FIG. 9 illustrates a block diagram of a battery management system 900 for a battery pack, e.g., a lead-acid battery pack, in accordance with another embodiment of the invention. FIG. 9 is described in combination with FIG. 2B and FIG. 3.

In one embodiment, the battery pack can include multiple battery modules. In the example of FIG. 9, a battery module including six battery cells 901-906 coupled in series is shown. Each of the battery cells 901-906 can be coupled to one of the balancing circuits 921A-926A. A controller 930 can be coupled to the battery cells 901-906 and the balancing circuits 921A-926A and can monitor the parameters, e.g., the voltages of the battery cells 901-906. Elements that are labeled the same as in FIG. 3 have similar functions and will not be repetitively described herein.

In one embodiment, an over voltage (OV) detection circuit 960 can be coupled to the terminals of the battery module and can monitor the voltage of the battery module in the battery pack. The OV detection circuit 960 also can be coupled to a module OV balancing circuit 962 that is coupled to the terminals of the battery module. In one embodiment, the module OV balancing circuit 962 can employ the structure of the balancing circuit shown in FIG. 2B to reduce the cost of the battery pack. More specifically, the module OV balancing circuit can include a resistor 281 and a switch 282 coupled in series as shown in FIG. 2B.

In one embodiment, the OV detection circuit 960 can monitor the voltage of the battery module and determine if an over voltage condition occurs. More specifically, the OV detection circuit 960 can set a predetermined threshold $V_{THOV}$, e.g., 14.76V, for a battery module of 12 volts. The OV detection circuit 960 can monitor the voltage of the battery module and compare the detected voltage with the predetermined threshold $V_{THOV}$, and can determine that an over voltage condition occurs when the detected voltage is greater than the predetermined threshold $V_{THOV}$. In response to an over voltage condition, the OV detection circuit 960 can generate a control signal to the module OV balancing circuit 962 to switch on the switch 282 included in the module OV balancing circuit 962. Thus, a bypass path including the switch 282 and the resistor 281 can be established between the terminals of the battery module. In this situation, the module OV balancing circuit 962 can discharge the battery module when the charging mode is terminated, or it can bypass the battery module in a charging mode in one or more cycles until the voltage of the battery module is not greater than the predetermined threshold $V_{THOV}$.

The OV detection circuit 960 can be used to monitor a battery module that includes various numbers of battery cells. Accordingly, the predetermined threshold $V_{THOV}$ can be set based on the number of the battery cells in a battery module, e.g., 26V for a battery module including twelve battery cells with battery module voltage of 24 volts. Furthermore, the resistance of the resistor included in the module OV balancing circuit 962 can be set in accordance with the number of the battery cells in the battery module to adjust the bypass current so as to improve the efficiency of the battery management system 900.

Advantageously, the module OV balancing circuit 962 can adjust the battery module voltage, and the balancing circuits 921A-926A can adjust the voltages of the battery cells in the battery module simultaneously. Thus, the response rate of the battery management system 900 can be increased, the efficiency of the battery management system 900 can be improved, and the life time of the battery pack can be increased.

Figure 10:
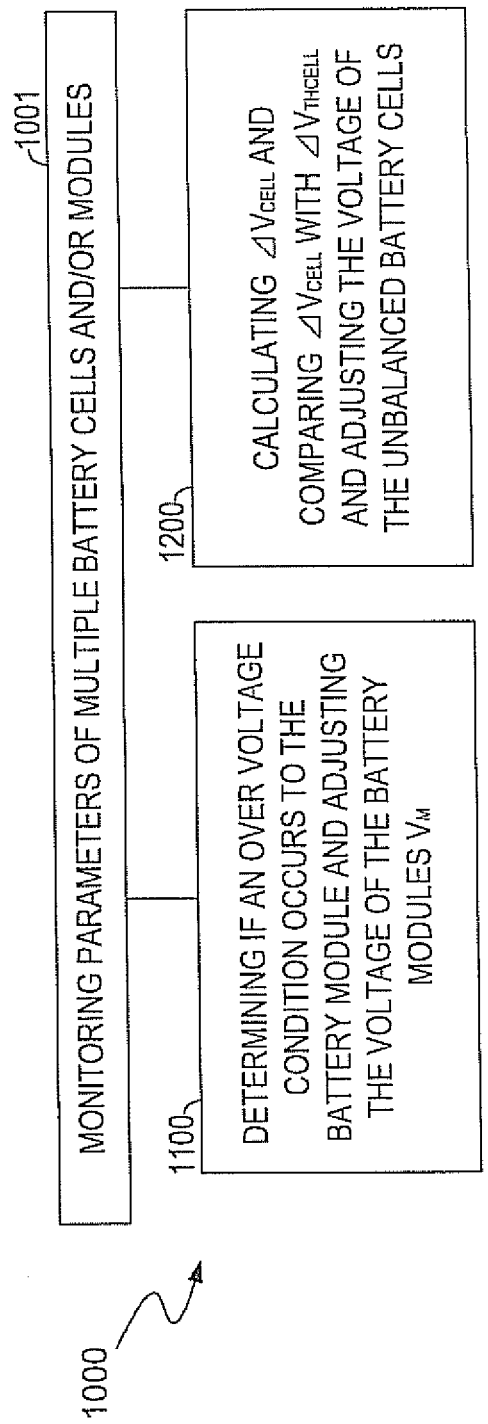
FIG. 10 illustrates a flowchart of operations performed by a battery management system for a battery pack, in accordance with one embodiment of the present disclosure.

FIG. 10 illustrates a flowchart 1000 of operations performed by a battery management system for a battery pack, e.g., a lead-acid battery pack, in accordance with one embodiment of the present invention. FIG. 10 is described in combination with FIG. 9.

In block 1001, the controller 930 can monitor parameters, e.g., the voltages of the multiple battery cells 901-906 in the battery module, and the OV detection circuit 960 monitors the voltage of the battery module $V_M$, as illustrated in FIG. 9.

In block 1100, the OV detection circuit 960 can determine if an over voltage condition occurs. For example, the OV detection circuit 960 can monitor the battery module voltage $V_M$ and compare $V_M$ with a predetermined threshold $V_{THMOV}$.

When the battery module voltage $V_M$ is greater than the predetermined threshold $V_{THMOV}$, an over voltage condition is detected. The OV detection circuit 960 can control the module OV balancing circuit 962 to adjust the battery module voltage $V_M$. More specifically, the module OV balancing circuit 962 can discharge or bypass the battery module until the battery module voltage $V_M$ is decreased to the predetermined threshold $V_{THMOV}$. Moreover, the predetermined threshold $V_{THMOV}$ can be set in accordance with the number of the cells in the battery module so that the over voltage condition can be detected regardless of the number of the cells in the battery module, and the resistance of the resistor in the module OV balancing circuit 962 can also be set in accordance with the number of the cells in the battery module, so that the bypass current can be adjusted and the efficiency of the battery management system 900 can be improved.

In block 1200, the controller 930 can calculate the voltage differences between any two of the multiple battery cells, e.g., $\Delta V_{CELL}$, and compare the voltage difference $\Delta V_{CELL}$ with a predetermined threshold $V_{THCELL}$. When $\Delta V_{CELL}$ is larger than the predetermined threshold $V_{THCELL}$, an unbalanced condition occurs across the multiple battery cells. The controller 930 can control the corresponding balancing circuits to adjust the voltages of the unbalanced cells.

More specifically, the corresponding balancing circuit can discharge the battery cell with the higher voltage in a discharging period or bypass the battery cell with the higher voltage in a charging period in one or more cycles until the voltage difference $V_{CELL}$ is decreased to the predetermined threshold $V_{THCELL}$.

Advantageously, multiple balancing circuits and the module OV balancing circuit can be employed to adjust the voltages of the multiple battery cells and/or modules simultaneously to improve the efficiency of the battery management system 900.

Accordingly, embodiments in accordance with the present invention provide a battery management system for a battery pack such as a lead-acid battery pack. The battery management system can include multiple controllers to sense voltages of multiple battery cells coupled in series and to control multiple balancing circuits to adjust the voltages of the battery cells if an unbalance occurs between the battery cells. If an abnormal condition occurs to the battery cells, the controller can take measures to protect the battery cells. Due to the balancing technology, the battery cells are protected against damage. Hence, the efficiency of the battery management system can be improved and battery lifetime can be extended.

The battery management system can further include a controller to sense voltages of battery modules coupled in series and to control multiple balancing circuits to adjust the voltages of the battery modules if an unbalance occurs between the battery modules. Due to the balancing technology, the battery modules are protected against damage. Hence, the efficiency of the battery management system can be improved and battery lifetime can be extended.

Battery Module Balancing with Individual Module Balancing Circuits and Comparators or Control Units A further embodiment provides a solution to the increasing challenges inherent in balancing the voltage outputs of a plurality of battery modules. Various embodiments of the present disclosure provide either a comparator or a module control unit (MCU) for each battery module. A first battery module's comparator or MCU compares a voltage output of the first battery module to a combined voltage output of the first battery module and a second battery module. As discussed in detail below, if a portion of the voltage output of the first battery module is greater than a portion of the combined voltage output of the first battery module and the second battery module, a first module balancing circuit for the first battery module will be activated and a second module balancing circuit for the second battery module will be deactivated, however, if the portion of the combined voltage output of the first battery module and the second battery module is higher than the voltage output of the first battery module, the second module balancing circuit for the second battery module will be activated and the first module balancing circuit deactivated.

Figure 11:
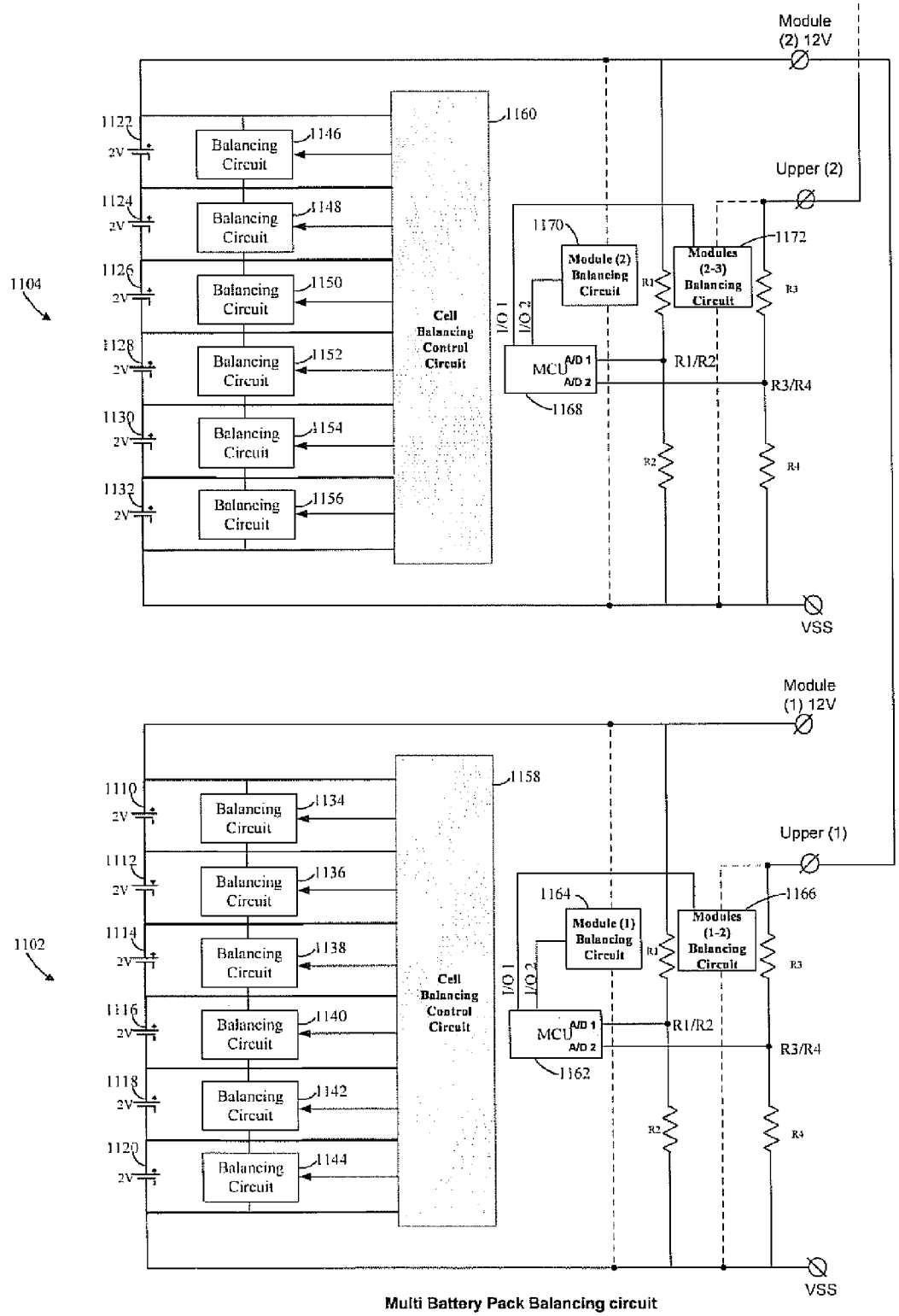
FIG. 11 illustrates a block diagram of a battery management system for a battery pack, in accordance with another embodiment of the present disclosure.
Figure 12:
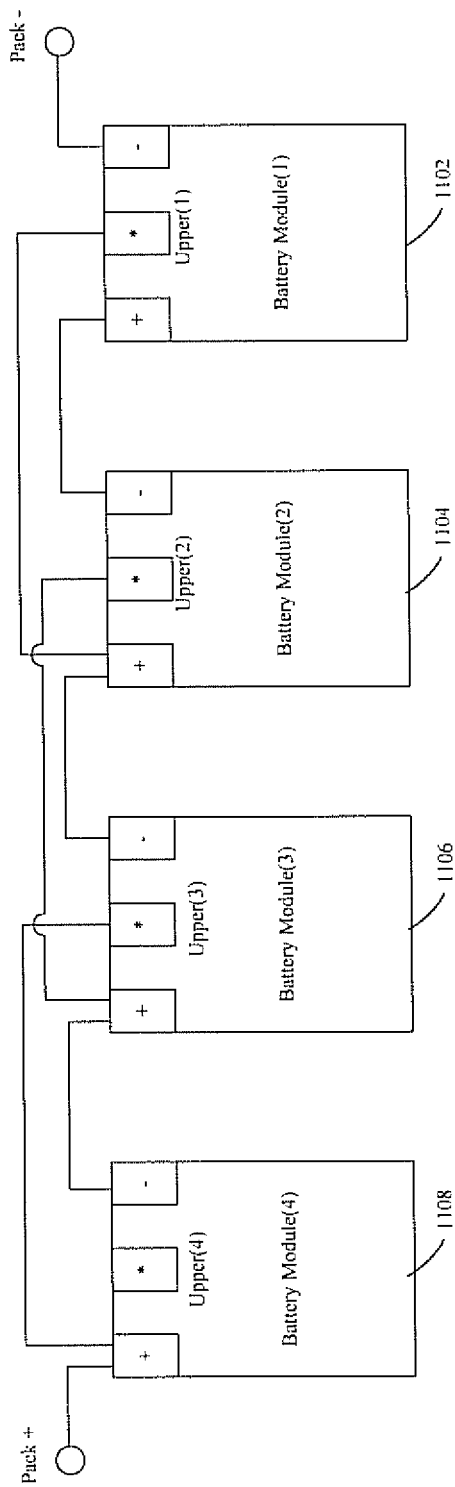
FIG. 12 illustrates a block diagram of a plurality of batteries, in accordance with another embodiment of the present disclosure.

As illustrated in FIGS. 11 and 12, one embodiment of a battery management system comprises a plurality of battery modules 1102-1108. In one embodiment, there are a total of four battery modules 1102-1108, but any number of battery modules may be used and are anticipated. As further illustrated in FIG. 11, a battery module 1102 can comprise a plurality of battery cells 1110-1120 which are connected in series. As also illustrated in FIG. 12, the plurality of battery modules 1102-1108 may also be connected in series. As previously discussed above, each battery cell 1110-1120 of battery module 1102 can also be connected to a corresponding balancing circuit 1134-1144. As also illustrated in FIG. 11 and discussed above, a battery module 1102 can also comprise a cell balancing control circuit 1158 for controlling the balancing of individual cells 1110-1120 of the battery module 1102 using the balancing circuits 1134-1144 as described above. As also illustrated in FIG. 11, each of the battery modules 1102-1108 shown in FIG. 12 can each comprise similar components. Therefore, battery module 1104 may also comprise a plurality of battery cells 1122-1132 connected in series, a balancing circuit 1146-1156 connected to each of the battery cells 1122-1132, and a cell balancing control circuit 1160 for controlling the balancing of individual cells 1122-1132 of the battery module 1104 using the balancing circuits 1146-1156.

In one embodiment shown in FIG. 11, the battery module 1102 can comprise a module control unit 1162 which controls a module balancing circuit 1164 for adjusting the voltage output of battery module 1102, and a module balancing circuit 1166 for adjusting the combined voltage output of battery modules 1102 and 1104. As illustrated in FIG. 11, the module balancing circuit 1166 adjusts the voltage output of battery modules 1102 and 1104 by adjusting the combined voltage output of battery module 1102 and battery module 1104. As illustrated in FIGS. 11 and 12, the module balancing circuit 1166 is connected to the positive terminal of battery module 1104 and the negative terminal of battery module 1102. As further illustrated, and discussed above, the battery modules are connected in series.

As discussed in detail above, the module balancing circuits 1164, 1166, as controlled by the module control unit 1162, may adjust the output of the battery modules 1102, 1104 they are connected to in a passive mode. As discussed in detail above, in a passive mode a module balancing circuit can discharge the battery module(s) it is connected to during a discharging period or through bypassing the battery module(s) in a charging period. As also discussed in detail above, the module balancing circuits may be replaced with a balancing unit 200C, as illustrated in FIG. 2C, which may balance the battery modules in an active mode.

In one embodiment, shown in FIG. 11, the module control unit 1162 comprises a pair of analog-to-digital inputs (A/D 1 and A/D 2) as well as a pair of outputs (I/O 1 and I/O 2). The outputs I/O 1 and I/O 2 are for controlling the module balancing circuits 1166 and 1164, respectively. As further illustrated in FIG. 11, the analog-to-digital inputs A/D 1 & A/D 2 receive a portion of the voltage outputs of battery modules 1102 and 1104, as determined by a pair of voltage dividers R1/R2 and R3/R4. The resistors making up the voltage divider R1/R2 are selected to provide a voltage dividing ratio that will reduce the voltage output of battery module 1102 to a voltage level within the input range parameters of the analog-to-digital input A/D 1. Similarly, the resistors making up the voltage divider R3/R4 are also selected to provide a voltage dividing ratio that will reduce the combined voltage output of battery modules 1102 and 1104 to a voltage level within the input range parameters of the analog-to-digital input A/D 2.

In one embodiment, the resistors of voltage divider R3/R4 are also selected to provide a voltage dividing ratio that will reduce the combined voltage output of battery modules 1102 and 1104 to a voltage level approximately equal to the voltage level provided by voltage divider R1/R2 such that the voltage output of battery module 1102 can be compared to the combined voltage output of battery modules 1102 and 1104. In one embodiment, as illustrated in FIG. 11, each battery module 1102, 1104 can comprise six battery cells 1110-1120 and 1122-1132 each providing an exemplary 2 volts for a combined voltage output of 12 volts for each battery module 1102, 1104. Therefore, if the voltage divider R1/R2 provides a voltage dividing ratio of 2:1, then to provide approximately equal voltage outputs, the voltage divider R3/R4 provides a voltage dividing ratio of 4:1. In other words, while the voltage divider R1/R2 (with a 2:1 ratio) can reduce the voltage output of battery module 1102 from 12 volts to 6 volts, the voltage divider R3/R4 (with a 4:1 ratio) can reduce the combined voltage output of battery modules 1102 and 1104 from 24 volts to 6 volts. The voltage dividing ratios presented are exemplary in nature and can be selected as required to meet analog-to-digital input parameter requirements, as well as other design requirements.

In one embodiment, as illustrated in FIG. 11 and discussed in detail above, the module control unit 1162 receives the voltage outputs of battery modules 1102 and 1104, as provided by the voltage dividers R1/R2 and R3/R4, and compares them. If the reduced voltage output of battery module 1102 is larger than the reduced combined voltage output of battery modules 1102 and 1104, the module balancing circuit 1164 for battery module 1102 can be activated. However, if the reduced combined voltage output of battery modules 1102 and 1104 is larger than the reduced voltage output of battery module 1102, the module balancing circuit 1158 for battery modules 1102 and 1104 in series can be activated.

In another embodiment, the module control units 1162, 1168 illustrated in FIG. 11 do not need to have approximately equal voltage levels received at the analog-to-digital inputs A/D 1 and A/D 2 to compare the voltage outputs of battery modules 1102 and 1104. Rather, the module control units 1162, 1168 can be optionally programmed to receive different input voltages at the analog-to-digital inputs A/D 1 and A/D 2 and still compare them. For example, the module control unit 1162 can receive at the analog-to-digital inputs A/D 1 and A/D 2 an input voltage of 2 volts from the voltage divider R1/R2 (providing a 6:1 ratio for an output voltage of 12 volts from battery module 1102) and an input voltage of 3 volts from the voltage divider R3/R4 (providing a 12:1 ratio for a combined output voltage of 36 volts from battery modules 1102 and 1104 (with battery module 1104 providing an output voltage of 24 volts)) and still determine that the reduced inputs were approximately equal. Such programming adjustments would be beneficial when battery modules of differing but known capacities are substituted without also requiring the replacement of the original voltage divider (R1/R2 and R3/R4) values. Instead, the module control unit 1162 can be reprogrammed to account for the voltage change.

As further illustrated in FIGS. 11 and 12, while the module control unit 1162 of battery module 1102 compares the voltage output of battery module 1102 to the combined voltage output of battery modules 1102 and 1104, the module control unit 1168 of battery module 1104 compares the voltage output of battery module 1104 to the combined voltage output of battery modules 1104 and 1106. Therefore, in an exemplary embodiment, it is possible for the voltage output of battery module 1104 to be adjusted by module balancing circuit 1170 of battery module 1104 as well as by the module balancing circuit 1166 (which is balancing the combined output of battery modules 1104 and 1102) of battery module 1102.

Figure 13:
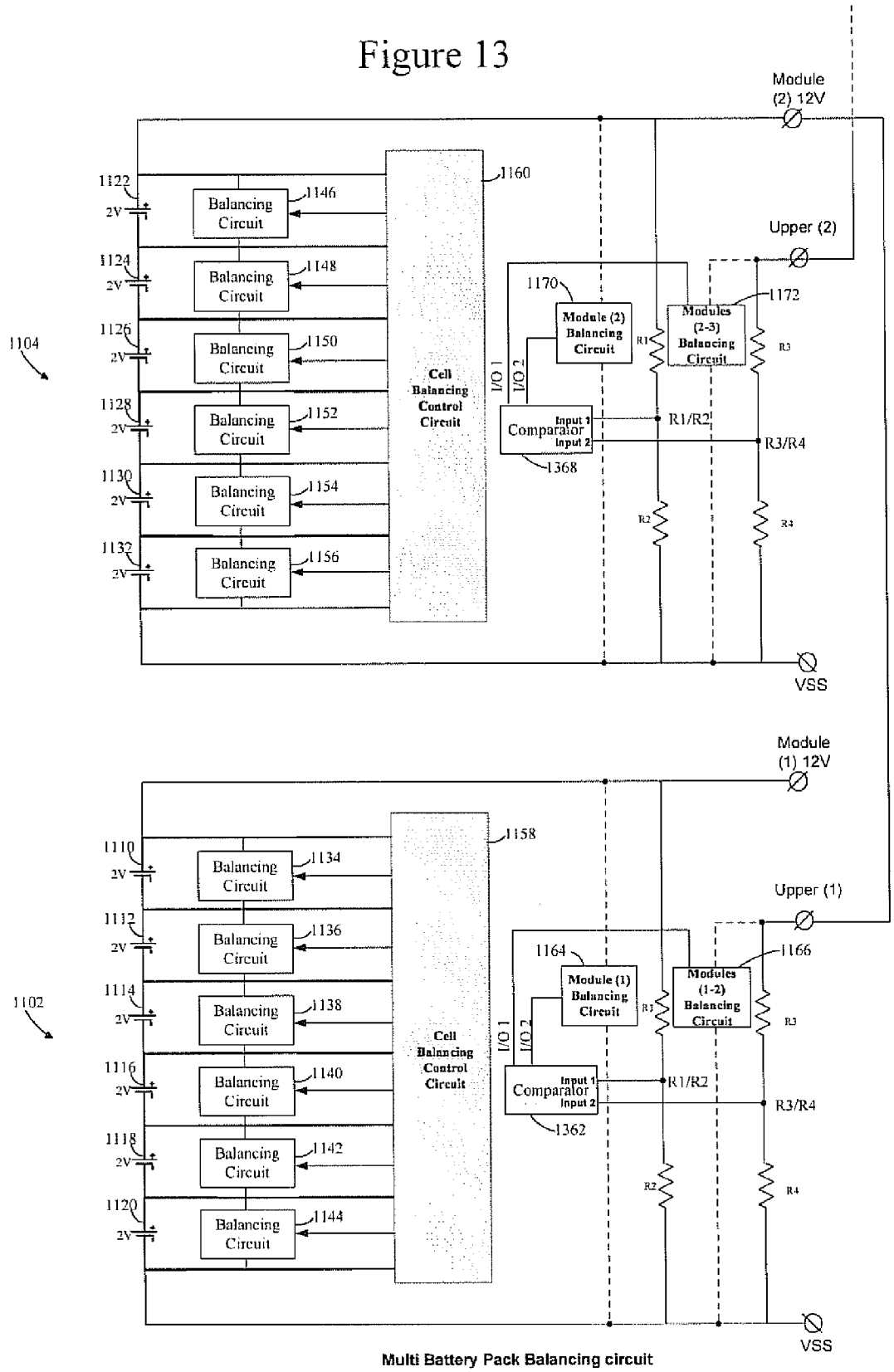
FIG. 13 illustrates a block diagram of a battery management system for a battery pack, in accordance with another embodiment of the present disclosure.

In one embodiment, as illustrated in FIG. 13, the module control units 1162, 1168 are replaced with comparators 1362, 1368. While the module control units 1162, 1168 can be highly accurate and flexible; comparators 1362, 1368 can be provided at a lower cost. The comparators 1362, 1368 can be used similar to the module control units 1162, 1168 as discussed above. In an exemplary embodiment, for proper comparison of voltage outputs by the comparators 1362, the voltage dividers R1/R2, R3/R4 will need to have their ratios set to ensure that the voltage levels received at the comparator inputs (input 1 and input 2) are approximately equal. As discussed above, the module control units 1162, 1168 are more flexible and would not necessarily need to have input voltage levels that are approximately equal, but as described above, could be programmed to compare voltages of differing levels.

Figure 14:
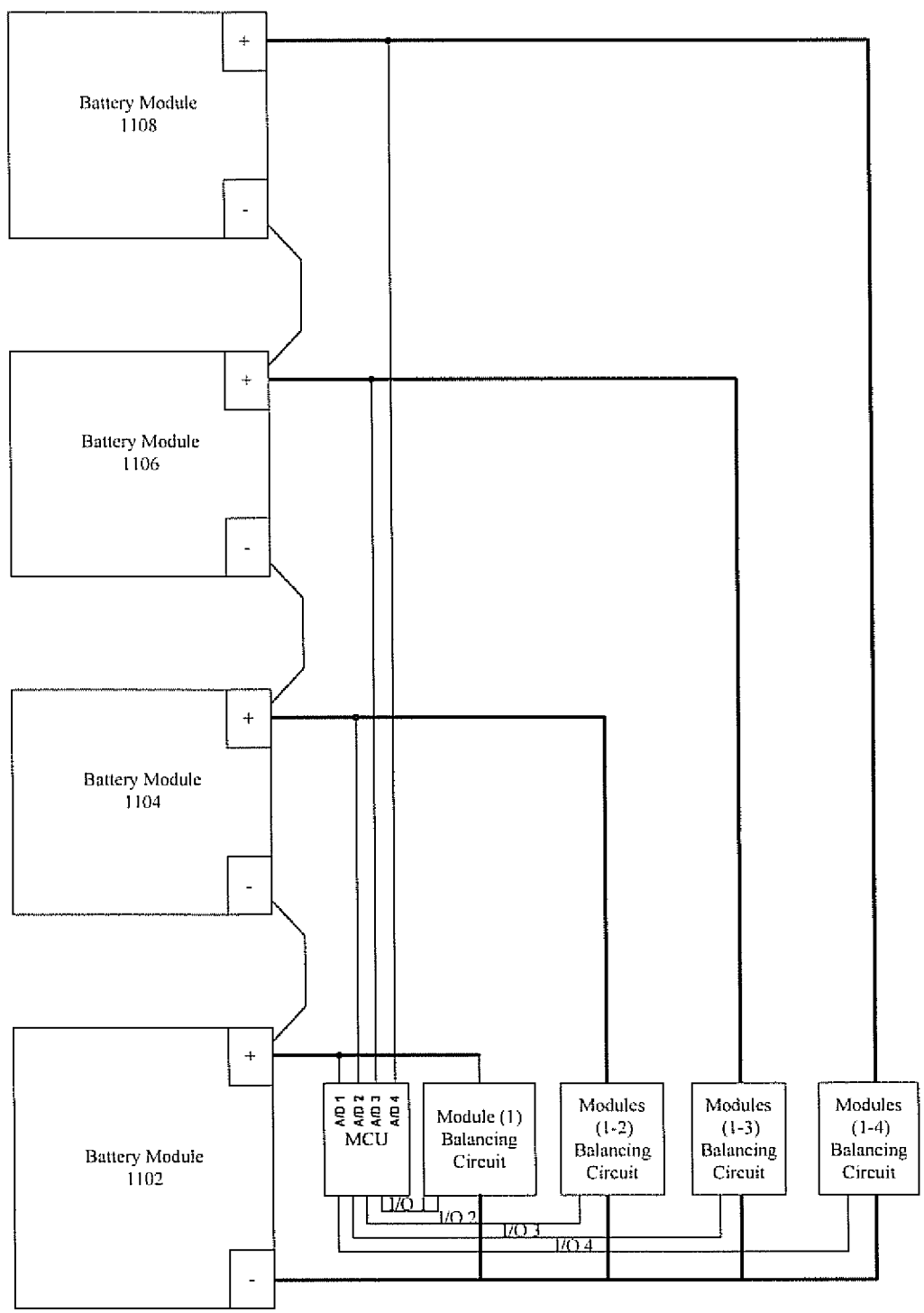
FIG. 14 illustrates a block diagram of a portion of a battery management system for a battery pack, in accordance with another embodiment of the present disclosure.

In a further embodiment, as illustrated in FIG. 14, additional inputs could be received by a module control unit or comparator such that the module control unit or comparator can compare the voltage output of battery module 1102 to the combined voltage output of battery modules 1102 and 1104, as well as the combined voltage output of battery modules 1102, 1104, and 1106, as well as any other additional voltage input, etc. Additional voltage dividers, as illustrated in FIG. 11, (as well as adequate programming for a module control unit) can be provided for each additional voltage output that the module control unit or comparator would be comparing. As also illustrated in FIG. 14, additional exemplary module balancing circuits can provide voltage output adjustments for battery module 1102, for a combination of battery modules 1102 and 1104, for a combination of battery modules 1102, 1104, and 1106, and a combination of battery modules 1102, 1104, 1106, and 1108. As discussed above, the selection of which module balancing circuit would be active can be based on a comparison of the output voltage of battery module 1102, the combined output voltage of battery modules 1102 and 1104, the combined output voltage of battery modules 1102, 1104, and 1106, and the combined output voltage of battery modules 1102, 1104, 1106, and 1108. While not illustrated in FIG. 14 for the sake of clarity, additional module balancing circuits can be utilized in the other battery modules, such as battery modules 1104 and 1106, etc.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A battery management system for a battery pack comprising:
   a plurality of battery modules;
   a plurality of first balancing units coupled to the plurality of battery modules;
   a plurality of second balancing units coupled to the plurality of battery modules, wherein first balancing units of the plurality of first balancing units and second balancing units of the plurality of second balancing units are coupled to each respective battery module; and
   a plurality of controllers coupled to the plurality of battery modules, wherein each controller is coupled to a respective battery module, wherein a first controller of the plurality of controllers is operable to control a first balancing unit of a first battery module to adjust a voltage output of the first battery module when the first controller determines the voltage output of the first battery module is greater than a combined voltage output of the first battery module and a second battery module, and wherein the first controller of the plurality of controllers is further operable to control a second balancing unit of the first battery module to adjust the combined voltage output of the first battery module and the second battery module when the first controller determines the combined voltage output of the first battery module and the second battery module is greater than the voltage output of the first battery module.

2. The battery management system for a battery of claim 1, wherein the first controller is further operable to compare a reduced voltage output of the first battery module to a reduced combined voltage output of the first and second battery modules.

3. The battery management system for a battery of claim 1, wherein the second balancing unit of the first battery module is operable to adjust the voltage output of the second battery module by adjusting a combined voltage output of the first and second battery modules.

4. The battery management system for a battery pack of claim 2, wherein the first battery module further comprises:
   a first voltage divider with a first ratio; and
   a second voltage divider with a second ratio, wherein the second ratio is selected to reduce the combined voltage output of the first and second battery modules to approximately equal a voltage output of the first voltage divider, wherein the voltage output of the first voltage divider is the reduced voltage output of the first battery module and the voltage output of the second voltage divider is the reduced combined voltage output of the first and second battery modules.

5. The battery management system for a battery pack of claim 4, wherein the first ratio of the first voltage divider is selected to reduce the voltage output of the first battery module to within an input voltage range of a first analog-to-digital converter of the first controller, and wherein the second ratio of the second voltage divider is selected to reduce the combined voltage output of the first and second battery modules to approximately equal the output of the first voltage divider.

6. The battery management system for a battery of claim 4, wherein voltage outputs of each of the plurality of battery modules are approximately equal.

7. The battery management system for a battery of claim 6, wherein a voltage reduction of the second voltage divider is twice the voltage reduction of the first voltage divider.

8. The battery management system for a battery of claim 6, wherein each battery module of the plurality of battery modules has an equal number of battery cells, each of the battery cells having an approximately equal output voltage.

9. The battery management system for a battery of claim 4, wherein a voltage output of at least one of the plurality of battery modules is not equal to voltage outputs of the rest of the plurality of battery modules, and wherein a voltage divider reducing the voltage output of the at least one of the plurality of battery modules reduces the voltage output to approximately equal a reduced voltage output of another battery module it is compared to.

10. The battery management system for a battery of claim 2, wherein the first controller is further operable to compare a reduced voltage output of the first battery module to a reduced combined voltage output of the first and second battery modules when a voltage output of one of the first battery module and the second battery module is not equal to the voltage output of the other.

11. A method of balancing a plurality of battery modules in a battery pack comprising:
   comparing a voltage output of a first battery module to a combined voltage output of the first battery module and a second battery module; and
   adjusting the voltage output of the first battery module when the voltage output of the first battery module is greater than the combined voltage output of the first battery module and the second battery module, and adjusting the combined voltage output of the first battery module and the second battery module when the combined voltage output of the first battery module and the second battery module is greater than the voltage output of the first battery module.

12. The method of balancing a plurality of battery modules in a battery pack of claim 11, wherein comparing the voltage output of the first battery module to the combined voltage output of the first battery module and the second battery module comprises comparing a reduced voltage output of the first battery module to a reduced combined voltage output of the first and second battery modules.

13. The method of balancing a plurality of battery modules in a battery pack of claim 11, wherein adjusting the combined voltage output of the first battery module and the second battery module adjusts the voltage output of the second battery module.

14. The method of balancing a plurality of battery modules in a battery pack of claim 12, wherein the reduced combined voltage output of the first and second battery modules approximately equals the reduced voltage output of the first battery module.

15. The method of balancing a plurality of battery modules in a battery pack of claim 14, wherein voltage outputs of each of the plurality of battery modules are approximately equal.

16. A battery management system for a battery pack comprising:
   a means for comparing a voltage output of a first battery module to a combined voltage output of the first battery module and a second battery module; and
   a means for adjusting the voltage output of the first battery module when the voltage output of the first battery module is greater than the combined voltage output of the first battery module and the second battery module, and adjusting the combined voltage output of the first battery module and the second battery module when the combined voltage output of the first battery module and the second battery module is greater than the voltage output of the first battery module.

17. The battery management system for a battery pack of claim 16, wherein the means for comparing further comprises a means for comparing a reduced voltage output of the first battery module to a reduced combined voltage output of the first and second battery modules.

18. The battery management system for a battery pack of claim 16, wherein the means for adjusting adjusts the voltage output of the second battery module by adjusting the combined voltage output of the first and second battery modules.

19. The battery management system for a battery pack of claim 17, wherein the reduced combined voltage output of the first and second battery modules approximately equals the reduced voltage output of the first battery module.

20. The battery management system for a battery pack of claim 19, wherein voltage outputs of each of the plurality of battery modules are approximately equal.

* * * * *